United States Patent
Sun et al.

(10) Patent No.: US 11,291,025 B2
(45) Date of Patent: Mar. 29, 2022

(54) REMAINING CHANNEL OCCUPANCY TIME INDICATIONS

(71) Applicant: QUALCOMM Incorporated, San Diego, CA (US)

(72) Inventors: Jing Sun, San Diego, CA (US); Ananta Narayanan Thyagarajan, Bangalore (IN); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/929,939

(22) Filed: Jul. 15, 2020

(65) Prior Publication Data
US 2021/0022157 A1    Jan. 21, 2021

(30) Foreign Application Priority Data
Jul. 16, 2019 (IN) .............................. 201941028563

(51) Int. Cl.
*H04W 4/00* (2018.01)
*H04W 72/12* (2009.01)

(52) U.S. Cl.
CPC ... *H04W 72/1257* (2013.01); *H04W 72/1289* (2013.01)

(58) Field of Classification Search
USPC ................................. 370/328, 329, 330, 331
See application file for complete search history.

(56) References Cited

U.S. PATENT DOCUMENTS

2019/0075562 A1*  3/2019  Cariou ................ H04W 74/002
2019/0349815 A1* 11/2019  Tiirola ................. H04W 28/26
(Continued)

OTHER PUBLICATIONS

Ericsson: "DL Signals and Channels for NR-U", 3GPP Draft, 3GPP TSG-RAN WG1 Meeting #97, R1-1907452, DL Signals and Channels for NR-U, 3rd Generation Partnership Project (3GPP),May 13, 2019-May 17, 2019, May 13, 2019. XP051728883, 8 pages Retrieved from the Internet: URL: http://www.3gpp.org/ftp/Meetings%5F3GPP% 5FSYNC/RAN1/Docs/R1%2D1907452%2Ezip [retrieved on May 13, 2019] section 3.3; p. 5-p. 6, the Whole Document.
(Continued)

*Primary Examiner* — David Q Nguyen
(74) *Attorney, Agent, or Firm* — The Marbury Law Group/Qualcomm

(57) ABSTRACT

A base station may generate a channel occupancy time (COT) indication for a user equipment (UE), the COT indication including a bit configuration and a quantized remaining COT duration, and transmit the COT indication to the UE. The quantized remaining COT duration may be a COT floor or a lower quantization level, or to a COT ceiling or a higher quantization level, in which generating the COT indication for the UE may include using a slot format indicator to cancel a radio resource control configured uplink or downlink transmission between a COT duration and the COT ceiling or higher quantization level. UE methods include receiving a COT indication of a bit configuration and a quantized remaining COT duration, and communicating with the base station based on the COT indication. The UE may monitor a physical downlink control channel for uplink and downlink transmissions based on the quantized remaining COT duration.

28 Claims, 11 Drawing Sheets

(56) References Cited

U.S. PATENT DOCUMENTS

| | | | |
|---|---|---|---|
| 2020/0029340 A1* | 1/2020 | He | H04W 72/02 |
| 2020/0053782 A1* | 2/2020 | Zhang | H04W 74/0816 |
| 2020/0229231 A1* | 7/2020 | Oh | H04W 72/042 |
| 2020/0305191 A1* | 9/2020 | Moon | H04W 74/0808 |
| 2020/0314891 A1* | 10/2020 | Li | H04W 16/14 |
| 2020/0337072 A1* | 10/2020 | Lunttila | H04L 5/0012 |
| 2020/0374933 A1* | 11/2020 | Lou | H04W 72/02 |
| 2021/0076418 A1* | 3/2021 | Schober | H04W 72/042 |
| 2021/0092768 A1* | 3/2021 | Kim | H04L 5/0053 |
| 2021/0243807 A1* | 8/2021 | Hooli | H04W 72/0453 |
| 2021/0321277 A1* | 10/2021 | Murray | H04L 41/0677 |

OTHER PUBLICATIONS

International Search Report and Written Opinion—PCT/US2020/042215—ISA/EPO—dted Sep. 15, 2020.

Motorola Mobility., et al., "Feature Lead Summary for NR-U DL Signals and Channels", 3GPP Draft, 3GPP TSG RAN WG1 #97, R1-1907705, 3rd Generation Partnership Project (3GPP), May 13, 2019-May 17, 2019, May 16, 2019, XP051739988, 24 Pages, Retrieved from the Internet: URL:http://www.3gpp.org/ftp/tsg%5Fran/WG1%5FRL1/TSGR1%5F97/Docs/R1%2D1907705%2Ezip [retrieved on May 16, 2019] p. 8: "Qualcomm" p. 9: "ZTE, Sanechips" p. 16: "ITRI". section 4; p. 8-p. 17, section 6; p. 18-p. 22.

Qualcomm Incorporated: "DL Signals and Channels for NR-U," 3GPP Draft, 3GPP TSG RAN WG1 Meeting #97, R1-1907259, 7.2.2.1.2 DL Signals and Channels for NR-U, 3rd Generation Partnership Project (3GPP), May 13, 2019-May 17, 2019, May 13, 2019, XP051728699, 12 pages, Retrieved from the Internet: URL: http://www.3gpp.org/ftp/Meetings%5F3GPP%5FSYNC/RAN1/Docs/R1%2D1907259%2Ezip [retrieved on May 13, 2019] section 4; p. 6-p. 8 section 7; p. 9-p. 10, the Whole Document.

Samsung: "DL Signals and Channels for NR-U," 3GPP Draft, 3GPP TSG RAN WG1 #97, R1-1906918, DL Signal, 3rd Generation Partnership Project (3GPP); May 13, 2019-May 17, 2019, May 13, 2019, XP051728368, 6 pages, Retrieved from the Internet: URL: http://www.3gpp.org/ftp/Meetings%5F3GPP%5FSYNC/RAN1/Docs/R1%2D1906918%2Ezip [retrieved on May 13, 2019] section 3; p. 3-p. 5.

* cited by examiner

REMAINING CHANNEL OCCUPANCY TIME INDICATIONS

RELATED APPLICATIONS

This application claims priority to India Provisional Application No. 201941028563 entitled "Remaining Channel Occupancy Time Indications" filed Jul. 16, 2019, the entire contents of which are hereby incorporated by reference for all purposes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.).

A wireless communication network may include a number of base stations that can support communications with a number of mobile devices or user equipment (UE). A mobile device may communicate with a base station via downlink (DL) and uplink (UL) communications. The DL (or forward link) refers to the communication link of transmissions from the BS to the mobile device, and the UL (or reverse link) refers to the communication link of transmissions from the mobile device to the base station.

Multiple access technologies have been adopted in various telecommunication standards to provide a common protocol that enables different mobile devices to communicate on a municipal, national, regional, and even global level. Fifth Generation (5G) New Radio (NR), which also may be referred to as 5G or NR, is a set of enhancements to the Long Term Evolution (LTE) mobile standard promulgated by Third Generation Partnership Project (3GPP). NR is designed to better support mobile broadband Internet access by improving spectral efficiency, lowering costs, improving services, making use of new spectrum, and better integrating with other open standards, as well as supporting beamforming, multiple-input multiple-output (MIMO) antenna technology, and carrier aggregation.

SUMMARY

Various aspects of the disclosures include methods of wireless communication signaling or indicating a remaining channel occupancy time (COT) duration in a transmit opportunity (TXOP) with fewer overhead bits in the control channel via quantization. Various aspects of the disclosure may include methods of wireless communication performed by a base station (BS), which may include generating a COT indication for a user equipment (UE) in which the COT indication includes a bit configuration and a quantized remaining COT duration, and transmitting the COT indication to the UE.

In some aspects, the remaining COT duration may be quantized to a COT floor (or a lower quantization level, rounded-down duration value, etc.). In some aspects, the remaining COT duration may be quantized to a COT ceiling or a higher quantization level, rounded-up duration value, etc. In some aspects, generating the COT indication for the UE may include using a slot format indicator (SFI) to explicitly cancel a radio resource control (RRC) configured UL or DL transmission between an actual COT duration and the COT ceiling (or the higher quantization level).

In some aspects, the bit configuration may include a bit that indicates whether a UL RRC configured transmission should use a cat2 listen-before-talk (LBT) mode or cat4 LBT mode for a portion of a TXOP in the time between a COT floor and a COT ceiling. In some aspects, the bit configuration may include a bit that indicates whether a DL RRC configured transmission is valid for the portion of the TXOP in the time between the COT floor and the COT ceiling. In some aspects, the bit configuration may include a bit that indicates whether a UL RRC configured transmission should use the cat2 LBT mode or the cat4 LBT mode for a portion of the TXOP before the COT floor. In some aspects, the bit configuration may include a bit that indicates whether a DL RRC configured transmission is valid for the portion of the TXOP before the COT floor.

In some aspects, generating the COT indication for the UE may include generating multiple COT indications within a TXOP, and transmitting the COT indication to the UE may include transmitting the multiple COT indications to the UE. In some aspects, the quantized remaining COT duration in each of the multiple COT indications may indicate a same end of the TXOP. In some aspects, the quantized remaining COT durations in at least two of the multiple COT indications may indicate a different end of the TXOP. In some aspects, the end of the TXOP occurs later than the quantized remaining COT duration. In some aspects, the end of the TXOP occurs earlier than the quantized remaining COT duration. In some aspects, the different end of the TXOP may occur earlier or later than the quantized remaining COT duration depending on the quantized remaining COT duration.

Some aspects may include quantizing a remaining COT duration by adjusting the remaining COT duration value to a rounded-up value (or next quantization values) or COT ceiling or a rounded-down value (or previous quantization value) or COT floor. In some aspects, the quantized remaining COT duration may change during the multiple COT indications within the TXOP.

In some aspects, the bit configuration may include one or more pause indication bits that indicate whether UL RRC configured transmissions within a TXOP fall inside a pause. Some aspects may include dividing the TXOP into multiple TXOP segments, and each of the pause indication bits may indicate cat2 LBT mode or cat4 LBT mode for each of the multiple TXOP segments for UL RRC configured transmissions.

In some aspects, generating the COT indication for the UE further may include generating a sub-band usage indication within the COT or TXOP. In some aspects, the sub-band usage indication may indicate frequencies and/or sub-bands that are included in the COT or TXOP. Some aspects may include changing the sub-band usage indication in the COT or TXOP. In some aspects, changing the sub-band usage indication in the COT may include reducing the frequencies and/or sub-bands included in the COT or TXOP.

Further aspects may include a base station including a processor configured with processor-executable instructions to perform operations of any of the methods summarized above. Further aspects may include a non-transitory processor-readable storage medium having stored thereon processor-executable software instructions configured to cause a processor in a base station to perform operations of any of the methods summarized above. Further aspects may include a base station having various means for accomplishing functions of any of the methods summarized.

Various aspects also include a method of wireless communication performed by a UE device, which may include receiving, from a base station, a COT indication that includes a bit configuration and a quantized remaining COT duration for the user equipment device, and communicating with the base station based on the COT indication.

Some aspects may include the UE device monitoring a PDCCH for UL and DL transmissions based on the quantized remaining COT duration. In some aspects, receiving the COT indication may include receiving in a control channel a signal or indication of the quantized remaining COT duration that uses fewer overhead bits. The quantization may be configured by RRC and/or specified in a standard based on a number of bits available in the control channel The quantization may be linear (e.g., a step size and range configured) or non-linear (e.g., a table with bits mapping to duration values).

Some aspects may include determining whether the quantized remaining COT duration has expired, and transitioning from a Cat2 LBT mode to a Cat4 LBT mode in response to determining that the quantized remaining COT duration has expired.

In some aspects, receiving the COT indication may include receiving a COT indication that includes a quantized remaining COT duration that quantizes a remaining COT duration to at least one of a COT floor, a lower quantization level, a COT ceiling, or a higher quantization level. Some aspects may include avoiding incorrect use of a PDCCH monitoring configuration inside the TXOP when the PDCCH monitoring configuration inside the TXOP is different than the PDCCH monitoring configuration outside the TXOP by not switching the PDCCH monitoring configuration until after the COT ceiling. Some aspects may include avoiding incorrect use of a PDCCH monitoring configuration outside the TXOP when the PDCCH monitoring configuration inside the TXOP is different than the PDCCH monitoring configuration outside the TXOP by switching to mini-slot monitoring after the COT floor, or using the PDCCH monitoring configuration outside the TXOP after the COT floor. Some aspects may include avoiding incorrect use of a PDCCH monitoring configuration outside the TXOP when a bit, or a PDCCH monitoring flag, included in the bit configuration determines a PDCCH monitoring behavior and the PDCCH monitoring configuration inside the TXOP is different than the PDCCH monitoring configuration outside the TXOP by not switching the PDCCH monitoring configuration until after the COT ceiling, and/or switching to PDCCH monitoring configuration outside the TXOP after the COT floor.

In some aspects, the bit configuration may include one or more pause indication bits that indicate whether UL RRC configured transmissions within a TXOP fall inside a pause. In such aspects, the TXOP may be divided into multiple TXOP segments, and each of the pause indication bits may indicate cat2 LBT mode or cat4 LBT mode for each of the multiple TXOP segments for UL RRC configured transmissions.

In some aspects, receiving the COT indication may include receiving a sub-band usage indication within the COT or TXOP. In some aspects, the sub-band usage indication may identify frequencies and/or sub-bands that are included in the COT or TXOP. In some aspects, the sub-band usage indication in the COT or TXOP may change, which may include reductions in the frequencies and/or sub-bands included in the COT or TXOP. Some aspects may include utilizing a COT duration (or quantized indication of remaining COT duration values) for multiple sub-bands in the unlicensed channel (e.g., four 20 MHz sub-bands in an 80 MHz bandwidth).

Further aspects may include a UE device (or mobile device) including a processor configured with processor-executable instructions to perform operations of any of the methods summarized above. Further aspects may include a non-transitory processor-readable storage medium having stored thereon processor-executable software instructions configured to cause a processor in a UE device to perform operations of any of the methods summarized above. Further aspects may include a UE device having various means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
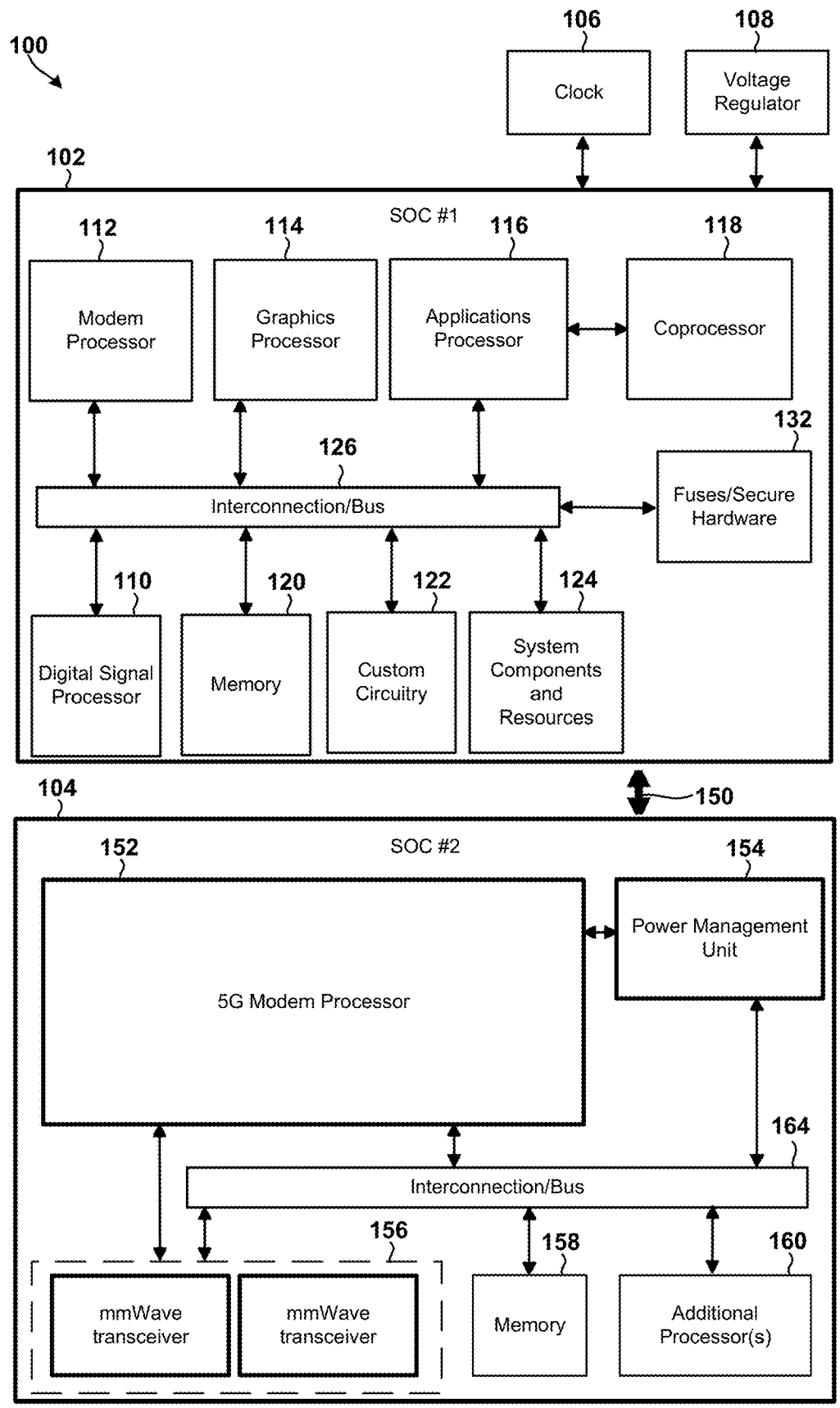
FIG. 1 is a block diagram illustrating an example 5G system in a package (SIP) in a mobile device that is suitable for implementing transmit opportunity channel occupancy time indication for new radio for unlicensed spectrum communications in accordance with some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices (e.g., user equipment devices, base stations, etc.) configured to implement the methods, for signaling or indicating a remaining channel occupancy time (COT) duration in a transmit opportunity (TXOP) with fewer overhead bits in the control channel via quantization. The quantization may be defined in a network (i.e., used by both the base station and user equipment, such via in a protocol) as either rounding-up to a whole number time value (referred to herein as a COT-ceiling value) or rounding-down to a whole number time value (referred to herein as a COT-floor value). For the purpose of synchronization, both the user equipment and base station may be configured so that they are informed in advance of whether the quantization will include COT-ceiling values (i.e., rounded-up time values) or COT-floor values (i.e., rounded-down time values).

Various embodiments also include computing devices configured to intelligently monitor a physical downlink control channel (PDCCH) for uplink (UL) and downlink (DL) transmissions based on a quantized indication remaining COT duration value. Various embodiments include adding one, two or more bits to the remaining COT duration indication to inform the mobile device about how to manage UL transmissions and/or monitor for DL transmissions near the end of a COT within the fractional time between the COT floor and the COT ceiling. Various embodiments also include computing devices configured to utilize a COT duration (or quantized indication remaining COT duration values) for multiple sub-bands in the unlicensed channel (e.g., four 20 MHz sub-bands in an 80 MHz bandwidth).

The terms "mobile device," "user equipment device" and "user equipment (UE)" are used interchangeably herein to refer to any one or all of cellular telephones, smartphones, Internet-of-things (IOT) devices, personal or mobile multi-media players, laptop computers, tablet computers, ultra-books, palm-top computers, wireless electronic mail receivers, multimedia Internet enabled cellular telephones, wireless gaming controllers, smart cars, autonomous vehicles, mobile device, and similar electronic devices which include a programmable processor, a memory and circuitry for sending and/or receiving wireless communication signals to/from wireless communication networks. While various embodiments are particularly useful in mobile devices, such as smartphones and tablets, the embodiments are generally useful in any electronic device that includes communication circuitry for accessing cellular or wireless communication networks, particularly 5G networks.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000TM), time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

New Radio for unlicensed spectrum (NR-U) is a communication system that may offload data traffic from licensed cellular bands or "licensed" spectrum to license-exempt or "unlicensed" spectrum. Licensed assisted access (LAA) is a communication technology that supports DL operation in unlicensed spectrum, and allows a mobile device to better utilize unlicensed spectrum. Listen-before-talk (LBT) is a procedure in which a transmitter applies a clear channel assessment (CCA) before using spectrum, effectively listening for other devices using the shared spectrum, and transmits only when no other devices are transmitting during what is referred to as a transmit opportunity (TXOP) in which a suitable slot is available. LAA/LBT technologies are important for ensuring efficient and cooperative use of shared spectrum resources by components that implement or use NR-U technologies.

New Radio for unlicensed spectrum provides for base stations to create temporary dedicated channels for communicating with a particular device or mobile device, provided that such usage is for a short and defined duration. The duration of such temporary channels is referred to as the channel occupancy time. When establishing such a temporary channel, the base station signals the channel occupancy time and mobile device are prohibited for transmitting as though using the dedicated channel after expiration of the channel occupancy time.

In NR-U communications systems, a COT may be defined for communications between a base station and a mobile device. The COT may include DL slots and UL slots that collectively make up a COT duration (e.g., between 5 and 9 milliseconds. etc.). The COT may also include pause slots that do not count towards the total COT duration, during which the mobile device may transition between the DL and UL slots, or vice versa.

The system (e.g., base station and/or mobile device) may be configured to communicate a COT structure indicator (COT-SI) that includes downlink control information (DCI) for monitoring a PDCCH, as well as information identifying a COT end symbol, a COT duration, a remaining COT duration, a COT pause indicator, a COT pause start symbol, a COT pause end symbol, a COT end location, a current location, a traffic class, a LBT type, a configured grant uplink (CG-UL) parameter, a public channel state information reference signal (P-CSI-RS) parameter, etc. In some embodiments, the COT-SI may include a slot format indicator (SFI), which may include detailed symbol level slot format information for all slots.

A mobile device may receive and use the COT-SI/SFI to identify the structure of a COT, and to determine one or more parameters for communicating with the base station. For example, a mobile device may use COT-SI/SFI to determine whether a particular resource or transmit occasion is inside of a COT, and determine the LBT type (e.g., category 4 (Cat4) LBT or category 2 (Cat2) LBT, etc.) for the communication based on whether the resource or transmit occasion is inside the COT.

To accurately describe the COT structure (e.g., accurately describe pauses in the COT, DL slots, UL slots, frequency structure, etc.), the COT-SI/SFI may require signaling relatively large number of bits. For example, an SFI for PDCCH may require signaling bits for each DL slot, UL slot, and pause slot. Signaling or communicating such a large amount of information may consume a significant amount of bandwidth and/or have a negative impact on the power consumption characteristics of the mobile device.

Various embodiments include methods of wireless communication signaling or indicating a remaining channel occupancy time (COT) duration in a transmit opportunity (TXOP) with fewer overhead bits in the control channel via quantization, intelligently monitoring a physical downlink control channel (PDCCH) for uplink (UL) and downlink (DL) transmissions based on a quantized indication remaining COT duration value, and utilize a COT duration value (or quantized remaining COT duration value) for multiple sub-bands in the unlicensed channel (e.g., four 20 MHz sub-bands in an 80 MHz bandwidth). Quantizing the indication of remaining COT duration, such as adjusting or changing a floating value to a whole number time unit (or quantum or step size), enables this time information to be sent with fewer bits because fractions of the time unit (or quantum or step size) do not need to be communicated.

The quantization can be linear or non-linear (e.g. a table with bits mapping to different durations). However, this results in some ambiguity when the remaining time is different than the quantum as happens whenever the remaining COT duration differs from a quantized duration (e.g., including a fraction of the quantum). This ambiguity exists between a rounded-down remaining COT duration value (referred to herein for brevity as the "COT floor" because this value is the closest quantized value that is smaller than the actual remaining COT duration) and a rounded-down remaining COT duration value (referred to herein for brevity as the "COT ceiling" because this value is the closest quantized value that is larger than the actual remaining COT duration).

To address this ambiguity, such as to ensure the mobile device does not violate the COT, in various embodiments one or more bits may be included in the indication of the remaining COT duration to inform the mobile device how to treat downlink opportunities and how to perform uplink transmissions. Including the bits in the indication of the remaining COT duration may enable the mobile device to better manage monitoring the physical downlink control channel to improve power usage efficiency.

To improve the power consumption characteristics of the mobile device, some embodiments may include base stations and/or mobile devices that are configured to communicate a "remaining COT duration" value for each DL slot. The phrases "network allocation vector" and "remaining channel occupancy time" may be used interchangeably in this application to refer to the remaining COT duration in a TXOP. Generally, network allocation vector (NAV) is the terminology used in WiFi or WiMax for virtual sensing or medium reservation (duration for which medium is busy/occupied). As noted above, a TXOP is typically between 5 and 9 milliseconds. The network allocation vector or remaining channel occupancy time indication may be transmitted by a base station during any DL transmission block within a channel occupancy time of a TXOP. The network allocation vector or remaining channel occupancy time indication informs the mobile device to which the channel occupancy is allotted about how much time remains for UL and DL communications before the channel is terminated. This enables the mobile device to manage UL transmissions and listen for DL transmissions according to either the temporary channel or the shared channel communication protocols.

The remaining COT duration value may be signaled independent of the NR Release 15 SFI indication that indicates the UL/DL for each symbol. A base station or mobile device configured in accordance with various embodiments may signal/communicate multiple remaining COT duration values in various DL transmissions, such as one remaining COT duration value in each DL slot, every other DL slot, or just one DL slot within the COT.

Because signaling the precise remaining COT duration value would require a large number of bits if the absolute time remaining is transmitted (e.g., time to two or three decimal places), in various embodiments the base station may be configured to quantize the time remaining information to reduce the number of bits signaled to the mobile device. For example, the base station may be configured to quantize a remaining COT duration value of 5.55 milliseconds to 5 milliseconds or to 6 milliseconds, which may significantly reduce the number of bits signals. Similarly, the mobile device is configured to use the quantized remaining time information (e.g., quantized remaining COT duration) to manage monitoring for DL transmissions and performing UL transmissions within the COT in view of the time error introduced by such quantizing.

Such quantization of the remaining COT duration and the use of such indications should not negatively impact the operations of the system. For example, a mobile device may perform a configured grant uplink (CG-UL) transmission during a pause slot, which may require that the mobile device transition between a Cat2 LBT (which is a shorter time to listen for others transmitting before initiating transmissions) and Cat4 LBT (which is a longer time to listen for others transmitting before initiating transmissions). To enable the mobile device to use the proper LBT category, mobile device may be informed by a one or more bits how to account for the potential duration error resulting from quantized remaining COT duration value.

For example, during a previously granted Cat4 based UL transmission (e.g., a Radio Resource Control (RRC) configured, scheduled UL from previous a TXOP, etc.), the eNodeB or a mobile device may automatically transition from Cat 4 LBT to a Cat 2 LBT with the proper COT indication even if the UL transmission is within the indicated COT (i.e. in this TXOP).

If the remaining COT duration is properly indicated, the system may change the mobile device assumptions for RRC configured DL (if still valid or cancelled). For example, P-CSI-RS will be transmitted in a gNB acquired TXOP if the CSI-RS location is within the COT. Otherwise the mobile device assumes that the DL transmission from the base station was cancelled. In this case, the accuracy of remaining COT duration indication can depend on RRC DL location within the current TXOP.

In addition, a properly remaining COT duration indication may be used for PDCCH monitoring switching by the mobile device. This may provide power saving, by enabling dynamic control monitoring changes by mobile device during a COT, especially when switching from slower monitoring (as possible during TXOP) to faster monitoring as appropriate during other times in a shared channel (i.e., outside a TXOP). In this case, the COT is not is time critical, and the remaining COT duration indication need not be highly accurate.

In addition, if the COT is properly indicated, a mobile device may switch from cat2 to cat4 LBT procedures for channel access after a COT with multi-TTI UL grant and UL slots that outside gNB TXOP.

Various embodiments may be implemented on a number of single processor and multiprocessor computer systems, including a system-on-chip (SOC) or system in a package (SIP). FIG. 1 illustrates an example computing system or SIP 100 architecture that may be used in mobile devices implementing the various embodiments.

In the example illustrated in FIG. 1, the SIP 100 includes a two SOCs 102, 104, a clock 106, and a voltage regulator 108. In some embodiments, the first SOC 102 operate as central processing unit (CPU) of the mobile device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 1, the first SOC 102 includes a digital signal processor (DSP) 110, a modem processor 112, a graphics processor 114, an application processor 116, one or more coprocessors 118 (e.g., vector co-processor) connected to one or more of the processors, memory 120, custom circuity 122, system components and resources 124, an interconnection/bus module 126, and fuses/secure hardware 132. The fuses/secure hardware 132 may include eFuses, QFPROMs, secure bits, secure flags, security enabled hardware, secure memory, or hardware, software, or firmware that could allocated to retailer or lender binding and/or used to implement a secure portion of the operating system, a secure operating system (SOS), a trusted execution environment (TEE), etc.

The second SOC 104 includes a 5G modem processor 152, a power management unit 154, an interconnection/bus module 164, a plurality of mmWave transceivers 156, memory 158, and various additional processors 160, such as an applications processor, packet processor, etc.

Each processor 110, 112, 114, 116, 118, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 10). In addition, any or all of the processors 110, 112, 114, 116, 118, 152, 160 may be included as part of a processor cluster architecture (e.g., a synchronous processor cluster architecture, an asynchronous or heterogeneous processor cluster architecture, etc.).

The first and second SOC 102, 104 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, access ports, timers, and other similar components used to support the processors and software clients running on a mobile device. The system components and resources 124 and/or custom circuitry 122 may also include circuitry to interface with peripheral devices, such as cameras, electronic displays, external memory chips, etc.

The first and second SOC 102, 104 may communicate via interconnection/bus module 150. The various processors 110, 112, 114, 116, 118, may be interconnected to one or more memory elements 120, system components and resources 124, and custom circuitry 122, and the fuses/secure hardware 132 via an interconnection/bus module 126. Similarly, the processors 152, 160 may be interconnected to the power management unit 154, the mmWave transceivers 156, memory 158, and various additional processors 160 via the interconnection/bus module 164. The interconnection/bus module 126, 150, 164 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 102, 104 may further include an input/output module (not illustrated) for communicating with resources external to the SOC, such as a clock 106 and a voltage regulator 108. Resources external to the SOC (e.g., clock 106, voltage regulator 108) may be shared by two or more of the internal SOC processors/cores.

In addition to the SIP 100 discussed above, the various embodiments may be implemented in a wide variety of computing systems, which may include a single processor, multiple processors, multicore processors, or any combination thereof.

Figure 2:
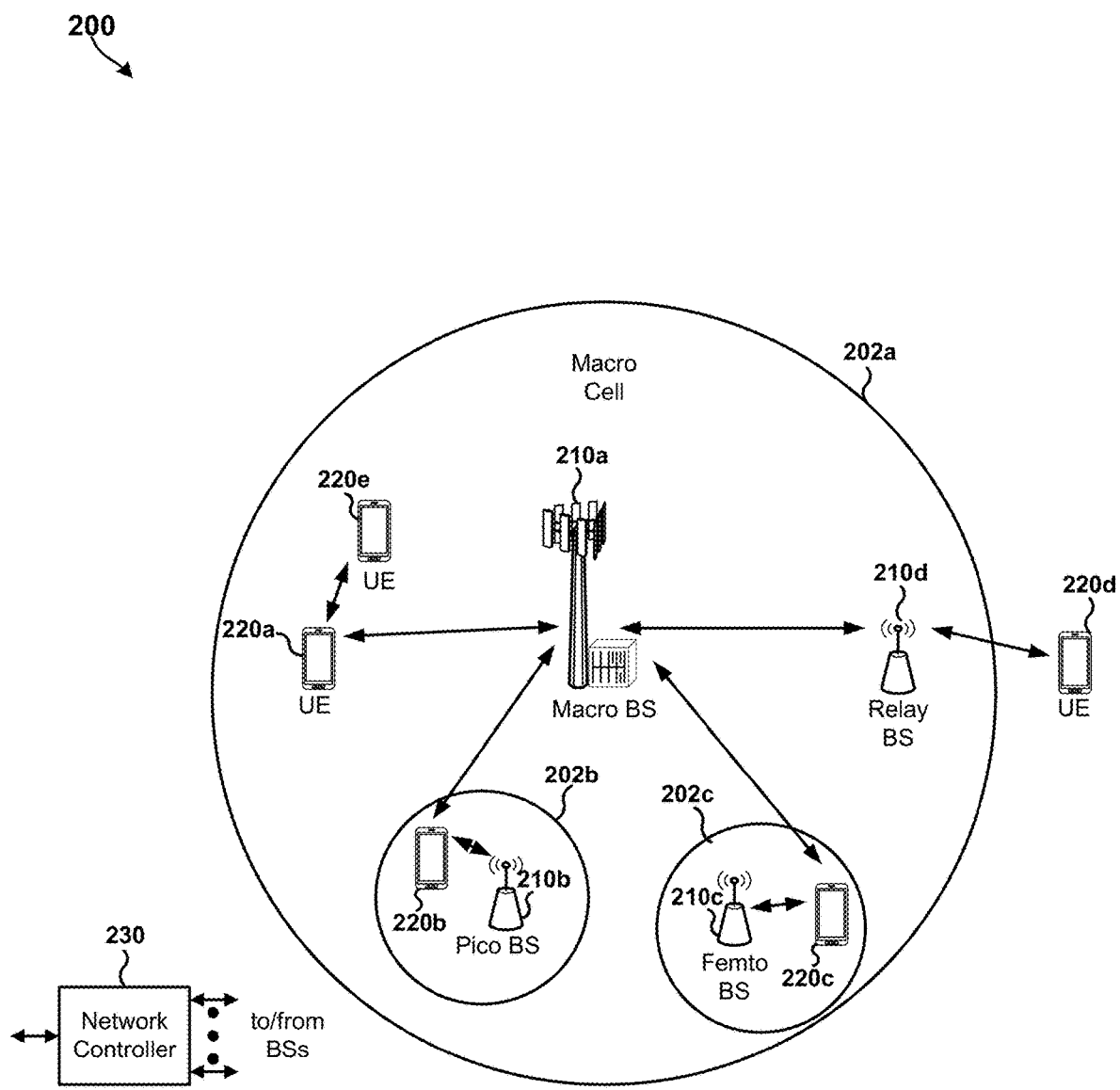
FIG. 2 is a block diagram illustrating an example communication system suitable for implementing transmit opportunity channel occupancy time indication for new radio for unlicensed spectrum communications in accordance with some embodiments.

FIG. 2 illustrates an example of a wireless network 200 that is suitable for implementing various embodiments. The wireless network 200 may be an 5G NR network, or any other suitable network such as an LTE network.

Wireless network 200 may include one or more mobile devices, illustrated as mobile device 220a-220e, each of which may include the SIP 100 illustrated in FIG. 1. The wireless network 200 may also include a number of base stations (BS), illustrated as the BS 210a, the BS 210b, the BS 210c, and the BS 210d, and other network entities. A base station is an entity that communicates with mobile device (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), gNB, or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 210a-210b may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 2, a base station 210a may be a macro BS for a macro cell 202a, a base station 210b may be a pico BS for a pico cell 202b, and a base station 210c may be a femto BS for a femto cell 202c. A base station may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations may be interconnected to one another as well as to one or more other base stations or network nodes (not illustrated) in the wireless network 200 through various types of backhaul interfaces, such as a direct physical connection, a virtual network, or a combination thereof using any suitable transport network The wireless network 200 also may include relay stations (e.g., relay BS 210d). A relay station is an entity that can receive a transmission of data from an upstream station (for example, a base station or a mobile device) and send a transmission of the data to a downstream station (for example, a mobile device or a base station). A relay station also may be a mobile device that can relay transmissions for other mobile devices. In the example illustrated in FIG. 2, a relay station 210d may communicate with the macro base station 210a and the mobile device 220d in order to facilitate communication between the base station 210a and the mobile device 220d. A relay station also may be referred to as a relay base station, a relay base station, a relay, etc.

The wireless network 200 may be a heterogeneous network that includes base stations of different types, for example, macro base stations, pico base stations, femto base stations, relay base stations, etc. These different types of base stations may have different transmit power levels, different coverage areas, and different impacts on interference in wireless network 200. For example, macro base stations may have a high transmit power level (for example, 5 to 40 Watts) whereas pico base stations, femto base stations, and relay base stations may have lower transmit power levels (for example, 0.1 to 2 Watts).

A network controller 230 may couple to a set of base stations and may provide coordination and control for these base stations. Network controller 230 may communicate with the base stations via a backhaul. The base stations also may communicate with one another, for example, directly or indirectly via a wireless or wireline backhaul.

The mobile devices 220a-220e (for example, 220a, 220b, 220c) may be dispersed throughout wireless network 200, and each mobile device may be stationary or mobile. A mobile device also may be referred to as an access terminal, a terminal, a mobile station, a subscriber unit, a station, etc. A mobile device may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. Some mobile devices may be considered a Customer Premises Equipment (CPE). The mobile device 220a-220e may be included inside a housing that houses components of the mobile device 220, such as processor components, memory components, similar components, or a combination thereof.

In general, any number of wireless networks may be deployed in a given geographic area. Each wireless network may support a particular radio access technology (RAT) and may operate on one or more frequencies. A RAT also may be referred to as an air interface. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a mobile device may function as a scheduling entity, scheduling resources for one or more subordinate entities (for example, one or more other mobile devices). In this example, the mobile device is functioning as a scheduling entity, and other mobile devices utilize resources scheduled by the mobile device for wireless communication. A mobile device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some embodiments, two or more mobile devices, such as mobile device 220a and mobile device 220e in FIG. 2, may communicate directly using one or more sidelink channels (for example, without using a base station 210a-210b as an intermediary to communicate with one another). For example, the mobile devices 220 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the mobile device 220 may perform scheduling operations, resource selection operations, as well as other operations described elsewhere herein as being performed by the base station 210.

In some embodiments, a base station 210*a*-210*b* and/or mobile device 220 may be configured to perform one or more techniques associated with COT structure indication in an idle state or a connected state. For example, a processor in a mobile device 220 may be configured to receive, from a BS 220, a set of COT structure indicators (COT-SIs) identifying a set of parameters of a COT for the mobile device, decode at least one COT-SI of the set of COT-SIs to determine at least one parameter of the set of parameters of the COT, and communicate with the BS 220 in accordance with the at least one parameter or based on decoding the at least one COT-SI.

In some embodiments, the mobile device 220 may receive COT table configuration information. For example, the mobile device 220 may receive a remaining minimum system information (RMSI) message identifying one or more small sized COT tables for use in obtaining partial COT structure information. In this case, a small sized COT table may be associated with less than a threshold size, such as less than a threshold quantity of entries, less than a threshold quantity of bits, or the like. In this case, the RMSI message may include configuration information for configuring the one or more COT tables, such as information identifying entries for the one or more COT tables, information identifying a concatenation for rows of the one or more COT tables, or the like. Additionally, alternatively, the RMSI also may include a PDCCH monitoring configuration, a DCI format for monitoring COT-SI, a size of a COT-SI PDCCH or DCI, a bit location in a DCI of information identifying a row concatenation, information identifying a quantity of bits per row index, information identifying a quantity of concatenated row indices, other bit indicators of other signaled parameters, a COT end symbol indicator, a COT pause start symbol indicator, a COT pause end symbol indicator, information relating to a triggered random access channel (RACH) process, CG-UL information, traffic class information, LBT information, COT acquisition information, or the like. For example, the mobile device 220 may determine a control resource set (CORESET), a sub-band, a wide-band, a search space set, a set of aggregation levels and corresponding number of candidates, a radio network temporary identifier (RNTI), a time duration, a monitoring periodicity, a monitoring offset, a length of a DCI, or the like for monitoring for a COT-SI, a slot format indicator (SFI) DCI, or the like. In this case, an idle mode mobile device 220 may be able to decode COT-SI bits to indicate one or more ordered entries of a first COT table and a second COT table, as described in more detail herein. In contrast, a connected mode mobile device 220 may be able to decode COT-SI bits for the first COT table, the second COT table, and the third COT table.

Additionally or alternatively, the mobile device 220 may determine other information regarding a COT structure. For example, when operating in an unlicensed band, the mobile device 220 may determine a COT duration. Additionally, or alternatively, the mobile device 220 may determine a concatenation of one or more rows of a COT table, a CG-UL behavior, or the like, as described in more detail herein.

In some embodiments, the mobile device 220 may receive and decode a set of COT-SIs. For example, the mobile device 220 may receive a first COT-SI identifying an index value for a first COT table, a second COT-SI identifying an index value for a second COT table, a third COT-SI identifying an index value for a third COT table, or the like. In this case, the COT-SIs may be bit indicators of a DCI received when monitoring for a PDCCH. In some embodiments, the mobile device 220 may determine one or more parameters for communicating with the BS 220 based on the set of COT-SIs. For example, mobile device 220 may determine an LBT type based on whether a transmit occasion is inside or outside of an acquired COT. In another example, the COT-SI may trigger or enable a RACH occasion within the acquired COT for an idle mode mobile device 220 to transmit a RACH transmission. In some embodiments, the first COT-SI may include information identifying a COT end symbol, a COT duration (which may be implemented as a remaining COT duration indicator), a first COT pause start symbol, a first COT pause end symbol, a second COT pause start symbol, a second COT pause end symbol, or the like. In this case, the first COT-SI may explicitly identify a remaining COT duration and a COT pause indicator in a DCI. In some cases, information identifying symbol locations, such as a COT end symbol identifier, first COT pause start symbol identifier, a first COT pause end symbol identifier, a second COT pause start symbol identifier, a second COT pause end symbol identifier, or the like, may be indicated as an offset from a current position.

In some embodiments, the mobile device 220 may receive and decode a set of COT-SIs based on a state of the mobile device 220. For example, an idle mode mobile device 220 may decode COT-SIs for the first COT table and the second COT table and a connected mode mobile device 220 may decode COT-SIs for the first COT table, the second COT table, and the third COT table. In some embodiments, the mobile device 220 may receive the COT-SIs via a single PDCCH. For example, the mobile device 220 may receive multiple bit indicators in a single PDCCH for multiple COT tables. Additionally, or alternatively, the mobile device 220 may receive the multiple bit indicators via multiple PDCCHs associated with different frequency resources, time resources, monitoring periodicities, monitoring configurations, or the like.

In some embodiments, the COT-SIs and the corresponding COT tables may be hierarchically arranged. For example, the mobile device 220 may receive multiple indicators relating to multiple COT tables, such as a set of three COT tables. In this case, the mobile device 220 may receive increasing amounts of information regarding the COT structure as additional resources are available, rather than using a relatively large single resource to signal all information regarding the COT structure.

In some embodiments, the mobile device 220 may receive multiple COT tables in different incremental stages. For example, the mobile device 220 may receive the first COT table and the second COT table through an RMSI and may receive the third COT table after connecting and via a mobile device specific RRC message. In another example, the first COT table may be stored, and the mobile device 220 may receive a first part of the third COT table in the RMSI and a second part of the third COT table in a mobile device specific RRC after connecting. In this case, the first part of the third COT table may be the second COT table.

In some embodiments, the mobile device 220 may determine a particular set of information regarding the COT structure based on the first COT table. For example, with regard to the first COT table, the mobile device 220 may determine whether each symbol in a slot is inside a COT or outside a COT without indicating whether a symbol is for UL or DL. In this case, a quantity of rows and entries of the first COT table may be relatively short, such as a set of 8 rows and a set of 14 columns, since the first COT table is configured through the RMSI which may be limited in size; however, the mobile device 220 may receive an indicator via a DCI to concatenate a set of row indices. In this way, the mobile device 220 is enabled to receive a single COT-SI index for the first COT table that identifies a COT structure for multiple upcoming slots. As another example, the first COT table may indicate, via a single row, whether multiple slots or symbols are inside a COT or outside a COT.

In some embodiments, the mobile device 220 may combine the COT-SI information regarding the first COT table with other COT information received with the COT-SI or separate from the COT-SI to determine a COT structure. For example, the mobile device 220 may receive a COT duration indicator (which may be indicated using a remaining COT duration indicator), a COT pause indicator, or the like in a DCI to combine with information regarding whether a particular symbol or slot is inside a COT or outside a COT. In some embodiments, the COT pause indicator may indicate a start of a COT pause, a length of a COT pause, an end of a COT pause, or the like. In some embodiments, the COT pause indicator may use a particular identifier. For example, the mobile device 220 may interpret an outside COT indication ("O" or "Out") disposed between multiple inside COT indications ("I's" or "In's") as a COT pause indicator. Additionally, or alternatively, the mobile device 220 may receive an explicit COT pause indicator (which could be represented as "P" or "Pause"), a COT start symbol and end symbol identifier from which the mobile device 220 can derive the COT pause, or the like.

In some embodiments, the mobile device 220 may receive a first COT-SI that explicitly includes a COT end symbol or a COT duration indicator (which may be a remaining COT duration indicator), a COT pause start symbol, and a COT end symbol. In this case, the mobile device 220 may not receive the first COT table.

Additionally, or alternatively, with regard to a second COT table, the mobile device 220 may determine whether a slot is assigned for downlink ("D"), assigned for uplink ("U"), flexibly assigned ("F"), included in a COT pause ("O" or "P"), or the like. In this case, the second COT table provides partial slot information, such as providing one of a slot level indication, a mini-slot level indication, a symbol-group level indication, or the like, rather than multiple levels of indication, thereby reducing resource utilization. In some embodiments, the second COT table may identify a slot assignment for multiple slots with each index, but less than an entirety of a COT. In this case, the mobile device 220 may receive a COT-SI DCI to concatenate multiple row indices to enable signaling of a greater portion of a COT or the entirety of the COT.

In some embodiments, the second COT table may be a truncation of the third COT table. For example, the second COT table may include a subset of rows of the third COT table, such as the first one or more rows. In this way, a size limit for tables configured through RMSI may be observed. In some embodiments, the mobile device 220 may receive a COT-SI DCI for the second COT table that identifies a row that is not included in the second COT table, such as an index greater than a greatest index of the second COT table. In this case, the mobile device 220 may determine that a set of slots are associated with a default configured assignment, such as an unknown assignment, and the mobile device 220 may communicate in accordance with the default configured assignment. As another example, each row in the second COT table may include information identifying a length of a COT duration, a quantity of DL slots, a quantity of DL symbols, a quantity of flexible symbols, a quantity of UL symbols, a quantity of UL slots, or the like.

Additionally or alternatively, with regard to a third COT table, the mobile device 220 may determine an entirety of a COT structure at a symbol level. For example, the third COT table may include information identifying whether each symbol is assigned as a DL symbol, an UL symbol, a flexible symbol, or the like. In some embodiments, the third COT table may be a slot format combination table that identifies a slot format for symbols of an indicated quantity of consecutive slots, as illustrated. In some embodiments, information derived from the third COT table may override information derived from the second COT table. For example, when a symbol is identified as flexibly assigned based on the second COT table, the mobile device 220 may determine that the flexible assignment is to be an UL assignment based on the third COT table.

In some embodiments, the mobile device 220 may receive other information in connection with the COT-SIs. For example, the mobile device 220 may receive information identifying a size of a DCI, information identifying a position of bits identifying COT table indices within a DCI, a quantity of concatenated rows of a COT table, or the like. Additionally, or alternatively, the mobile device 220 may receive information identifying a current location with respect to a start of a COT, a traffic priority class of the COT, whether the BS 220 or another mobile device 220 acquired the COT, a dynamically triggered physical RACH (PRACH) resource information, a dynamically triggered PRACH enable or trigger message, LBT type for the COT, a CG-UL parameter, a two-stage grant resource and triggering information, or the like.

In some embodiments, the mobile device 220 may determine a particular CG-UL behavior based on the CG-UL parameter. For example, the mobile device 220 may determine that CG-UL is allowed if a category type 4 LBT procedure is configured and a COT start is not yet detected. Additionally, or alternatively, when a COT start is detected but a COT-SI is not yet received, is not yet processed, or the like, the mobile device 220 may cancel a CG-UL. Additionally, or alternatively, the mobile device 220 may avoid canceling the CG-UL if a scheduled grant is not detected. Additionally, or alternatively, when at a time inside a COT and a COT-SI is detected and processed by the mobile device 220, the mobile device 220 may cancel the CG-UL when a slot is assigned for DL. Additionally, or alternatively, the mobile device 220 may refrain from canceling the CG-UL when the slot is assigned for UL, and may observe a signaled behavior associated with the CG-UL parameter when the slot is assigned as flexible slot.

In some embodiments, rather than receiving a COT-SI, the mobile device 220 may receive an explicit SFI for each slot of a COT. For example, the mobile device 220 may receive a DCI conveying the explicit SFI that indicates a slot format for an entirety of the COT based on a stored table associated with an unlicensed spectrum frame structure. Based on the stored table being smaller than a slot format combination table, such as based on the unlicensed spectrum being associated with a maximum COT size of less than a threshold, a quantity of bits in the DCI to signal the COT structure is reduced. In this case, the mobile device 220 may determine that the DCI conveys an explicit SFI based on a bit indicator in the DCI indicating that the DCI conveys the explicit SFI rather than one or more COT-SIs. In some embodiments, the DCI may signal a COT table that includes a symbol representing slots that are not within a COT. In some embodiments, the DCI may include an explicit COT duration indicator to enable the mobile device 220 to determine the length of the COT.

In some embodiments, the mobile device 220 may decode one or more COT-SIs and may communicate in accordance with a COT structure identified by the one or more COT-SIs. Each COT-SI may include information about the TXOP, such as the remaining COT duration, start and length of pauses inside the TXOP, DL and/or UL slot indications of the slots in TXOP, sub-band usage indication of the TXOP, etc.

Figure 3:
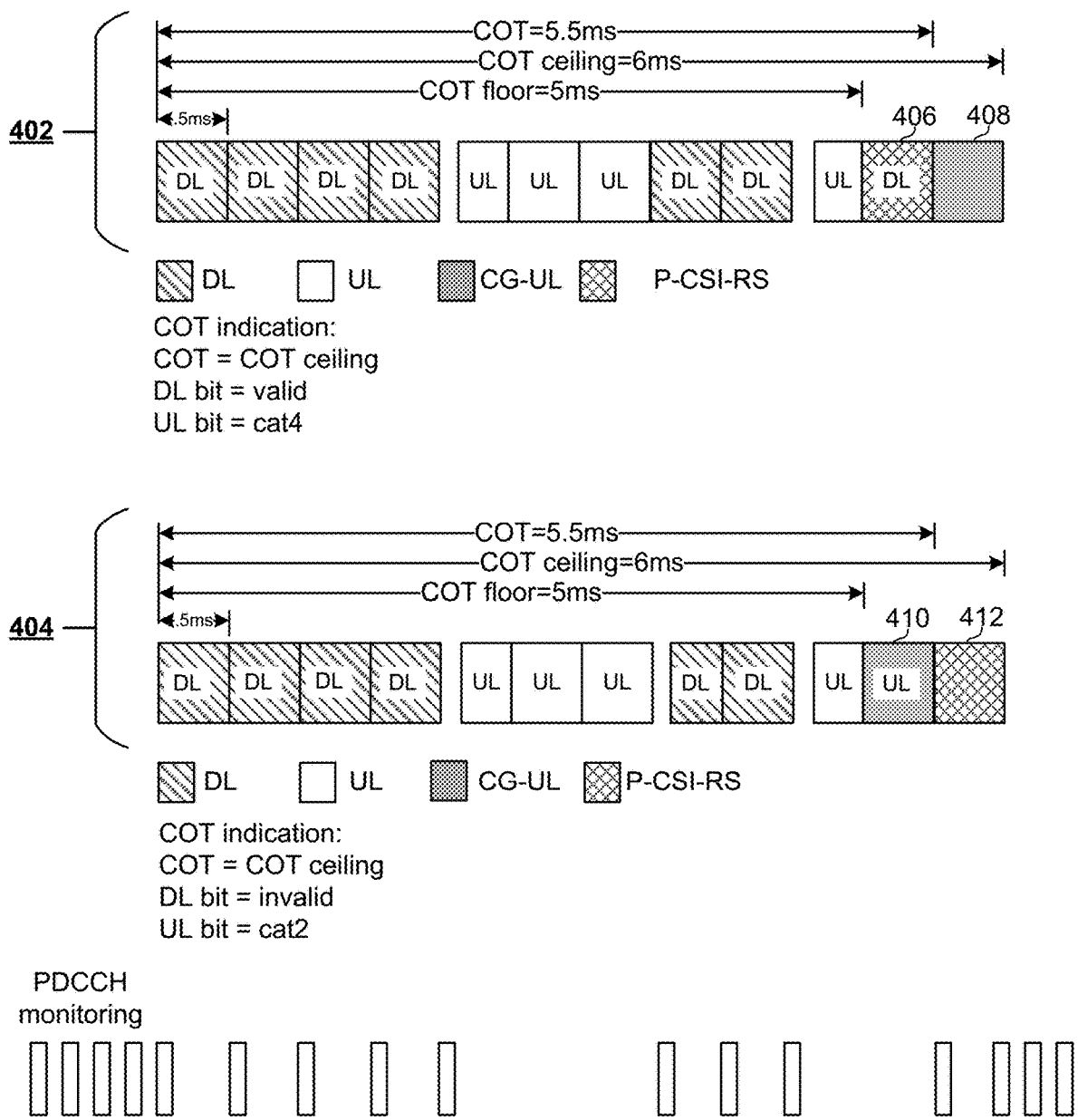
FIG. 3 is a message block diagram illustrating downlink and uplink transmission opportunities within a channel occupancy time, as well as illustrating problems of quantizing the indication of remaining COT duration to a whole number.

FIG. 3 illustrates DL and UL transmission opportunities within a channel occupancy time, as well as illustrating problems of quantizing the indication of remaining COT duration to a whole number. Because signaling the precise remaining COT duration value would require a large number of bits if the absolute time remaining is transmitted (e.g., time to two or three decimal places), the base station may be configured to quantize the time remaining information to reduce the number of bits signaled to the mobile device. Such quantization of the remaining COT duration and the use of such indications should not negatively impact the operations of the system.

In the example illustrated in FIG. 3, the remaining COT duration of 5.5 milliseconds (ms) is quantized to either a COT ceiling of 6 or a COT floor of 5 (the time unit may be arbitrary and need not be included in the indication as it may be a protocol-defined unit). When operating in Cat4 LBT mode 402, a remaining COT duration indication including the COT ceiling value may also include a DL P-CSI-RS slot 406 and an unspecified CG-UL slot 408. When operating in Cat2 LBT mode 404, the remaining COT duration indication including the COT ceiling value may include an CG-UL slot 410 and an unspecified P-CSI-RS slot 412. In both the Cat4 LBT mode 402 and Cat2 LBT mode 404, the remaining COT duration indication including a COT floor value may excludes CG-UL slots 408, 410 and the P-CSI-RS slot 406, 412.

In some embodiments, the base station may be configured to use only quantized COT (e.g. if the quantum is 1 ms, then COT durations are always multiples of 1 ms even if the maximum COT allowed is 5.5 ms, gNB uses 5 ms only). Additional remaining COT indications within TXOP may be in 1 ms gaps.

In some embodiments, the base station may be configured so that the remaining COT duration is always quantized or rounded-up to the next higher quantization level (COT-ceiling). Since it is not used for medium reservation (or virtual CCA like in WiFi), this operating mode does not violate 3GPP standards or regulations. For example, if the actual COT duration is 5.5 ms, and quantization is 1 ms granularity, the COT-ceiling value may be 6 ms (or just 6 as the time units is a protocol-defined unit). When receiving quantized remaining COT duration indications in which the duration is rounded-up to the COT-ceiling, mobile devices do not violate the actual COT duration (e.g. 5.5 ms, when COT indication is 6 ms) for UL RRC configured transmissions. In addition, the mobile devices may use the remaining COT duration indication to validate DL transmissions (e.g. any P-CSI-RS beyond 5.5 ms to be invalidated/cancelled), and determine that PDCCH monitoring beyond the actual the COT (e.g., beyond 5.5 ms) should follow the configuration for outside-of-TXOP monitoring.

In some embodiments, the system may be configured to use an SFI to explicitly cancel any RRC configured transmission beyond the actual COT duration (from actual COT duration to COT-ceiling). The system may also use SFI to cancel configured UL transmissions (& DL transmissions like p-csirs) from 5.5-6 ms (e.g., even though COT indication gives value of COT-ceiling=6 ms, SFI cancels all transmissions beyond 5.5 ms).

In some embodiments, the system may be configured to add a single bit in the COT indication to enable or cancel RRC configured DL/UL transmissions (or 1 bit each for DL and UL) in the last quantum of the indicated quantized COT duration. The last quantum of the quantized remaining COT duration may be a duration from the COT floor to the COT ceiling. If RRC configured DL/UL transmission is from 5 to 5.5 ms, then the bit is set to not cancel. If RRC configured DL/UL transmission is from 5.5 to 6 ms then the bit is set to cancel. As an extension, the system could be configured to add 2 bits per DL/UL to improve granularity of cancelling (e.g. 1st bit for 5-5.5 ms and second bit for 5.5-6 ms).

In some embodiments, a mobile device may be configured to cancel all RRC configured transmissions (DL, UL) in the last quantum duration (e.g.5-6 ms). Cancelling transmissions using COT indication may apply to connected mode signals such as CG-UL, P-SRS, CSI-RS, SUL, etc.

The PDCCH monitoring configuration inside the TXOP may be different compared to outside TXOP. The mobile device may incorrectly use the inside TXOP monitoring configuration from actual COT duration until the COT-ceiling (e.g. from 5.5-6 ms) as well.

Following are a few mobile device behavior alternatives: the mobile device may be configured to not switch the PDCCH monitoring configuration until COT-ceiling for less efficient operation but more power saving; the mobile device may be configured to switch to mini-slot monitoring (or monitoring cfg outside TXOP) before the COT-ceiling (e.g. from last slot: 5 ms onwards@15 KHz, or 5.5 ms onwards@30 KHz SCS, even if COT-ceiling is 6 ms), or mobile device may use the bit that validates DL transmissions to choose one of options above.

In some embodiments, the system may be configured to quantize the remaining COT duration to the previous lower quantization level, such as round down to the COT-floor (e.g. actual COT is 5.5 ms, COT-floor=5 ms). The mobile device may switch PDCCH monitoring cfg after the COT-floor (e.g. 5 ms, even if actual COT is 5.5 ms). The mobile device could be configured to monitor PDCCH slower until the next quantization level (e.g. 6 ms, except any UL in between) or to switch PDCCH monitoring faster after COT-floor (e.g. after 5 ms). From COT-floor to actual end of COT any RRC configured UL will have to use cat4 LBT. The mobile device may be configured to use the cat4 LBT mode (not critical, but less efficient), use a single bit to indicate whether to use cat2 or cat4 LBT modes for any configured UL transmissions for one quantum of duration after the COT-floor (e.g. 5-6 ms), or so that only granted/SUL transmissions can be used in the duration and the mobile device uses the LBT type (cat2/cat4) indicated in the supplementary uplink (SUL) grant even though the COT-SI indicates it is outside COT. Any configured DL Tx (e.g. P-CSI-RS) beyond the COT-floor may be assumed cancelled by the mobile device. A single bit may be used to cancel/retain configured DL Tx for 1 quantum after COT-floor (e.g. 5-6 ms).

Figure 4A:
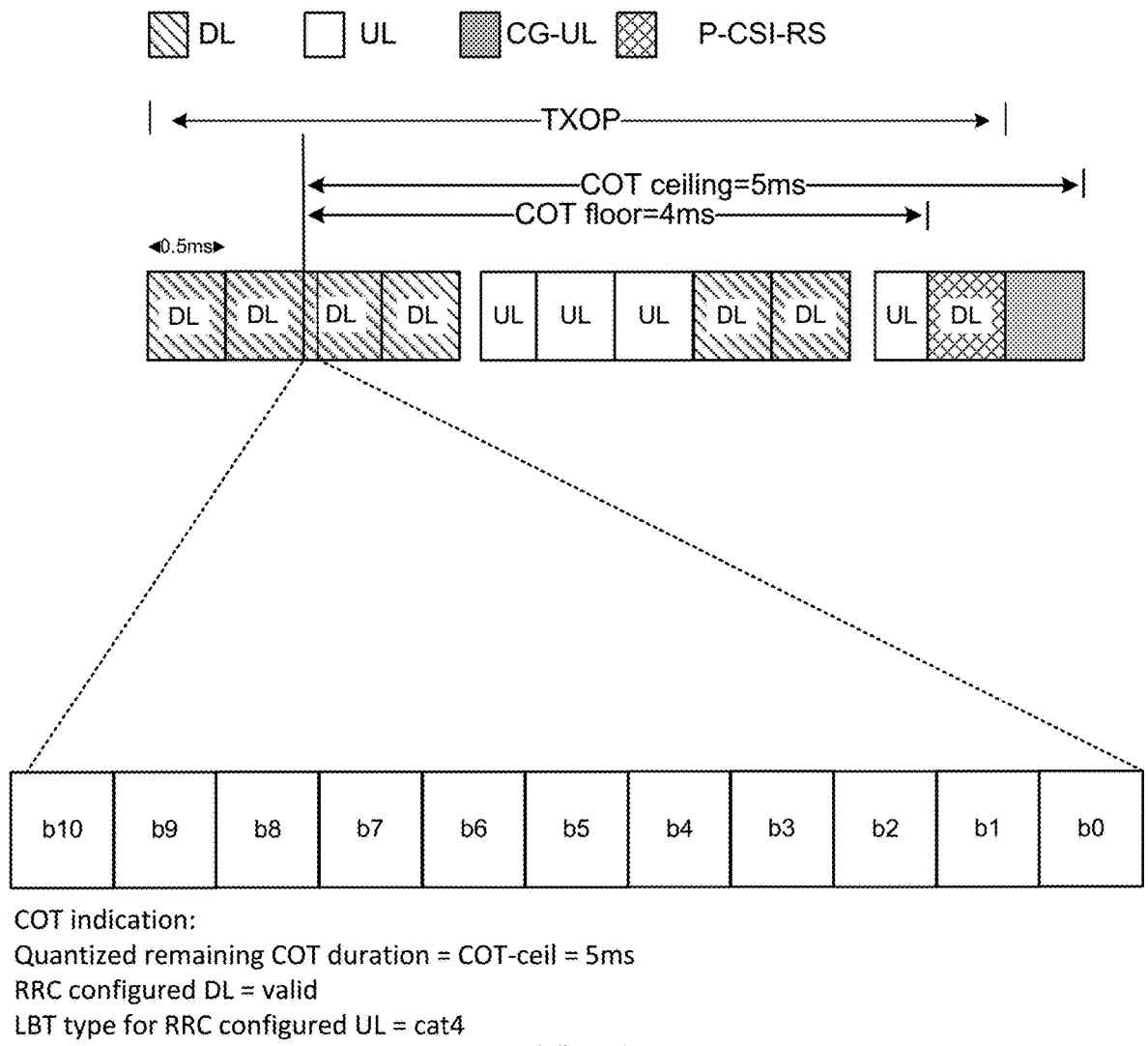
FIGS. 4A and 4B are block diagrams illustrating example transmission slots and bits that could be used to quantize COT durations in accordance with some embodiments.
Figure 4B:
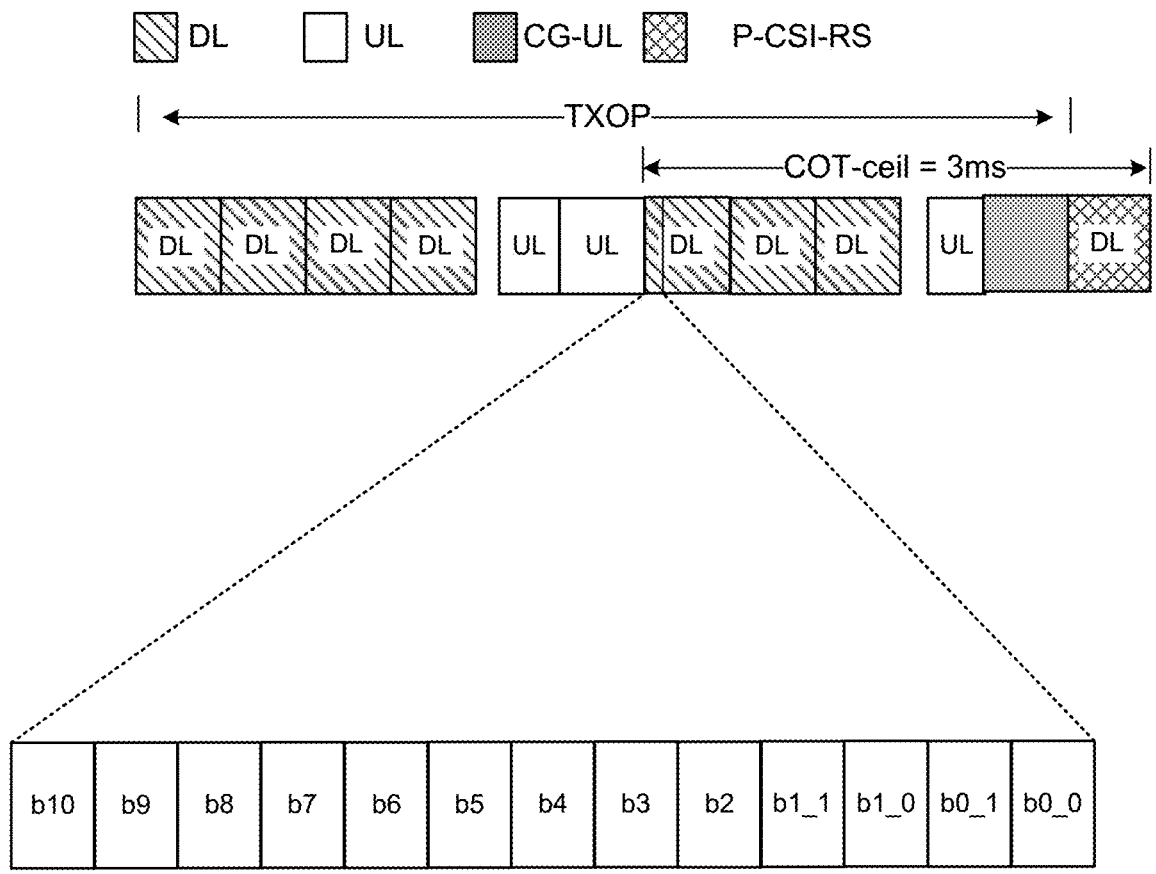

FIGS. 4A and 4B are block diagrams illustrating example bit configurations (or bit structures or symbols) that could be used to transmit quantize COT durations in accordance with some embodiments.

In the example illustrated in FIG. 4A, the RRC configured UL slot is outside the actual COT duration and hence cat4 is set for UE LBT for the last 4-5 ms. In addition, a DL symbol includes 11 bits (b10-b0). Bit b10, b9, b8, b7 may be 4 bits that represent 4 sub-bands, if present or not present in this TXOP. For example, b10=1 may mean sub-band0 is present, and b9=0 may mean sub-band1 is not present. Bit b6, b5, and b4 may indicate the quantized remaining COT duration. Bit b3 may indicate whether RRC configured UL should use cat2 or cat4 LBT for the last quantum of the TXOP (COT-floor to COT-ceil). Bit b2 may indicate whether a DL configured transmission is valid or invalid for the last portion of TXOP (COT-floor to COT-ceil). Bit b 1 may be a pause indication for an UL configured grant (or CG-UL, UL RRC configured transmission, etc.). If any UL configured slots inside TXOP (not the last portion) are inside a pause, then the LBT type is cat4, otherwise it is cat2. As such, this indication says if an UL configured slot is inside the TXOP (not the last portion), the UE will use a cat2 or cat4 LBT mode. Bit b0 may be pause indication for DL configured transmit. If any configured DL configured transmit inside the TXOP (not the last portion, which is b2) is valid or not.

It should be understood that the use of three bits for the quantized COT-duration (i.e., bit b6, b5, and b4) is only an example, and that more or fewer bits could be used to represent this value. In addition, in some embodiments, the quantized COT-duration may be non-linear, and the three bits (i.e., bit b6, b5, and b4) may be used to indicate 000: 0.25 ms; 001: 0.5 ms; 010: 1 ms; 011: 2 ms; 100: 3 ms; 101: 4 ms; 110: 5 ms; 111: 6 ms.

FIG. 4B illustrates that a DL symbol may include a slightly more involved pause indication. In this example the RRC configured DL is outside the actual end of TXOP, so this bit is set to invalid in this example. Also, cat2 is indicated for RRC configured UL for the last part since this is inside the actual end of TXOP.

In addition, there are 2 bits (b1_1,b1_0) for pause indication for UL configured grant in TXOP and 2 bits (b0_1, b0_0) for pause indication for DL RRC configured transmission. For example, (b1_1,b1_0)=(1,0) could mean in the first half of the TXOP (i.e. Oms to COT-floor/2. Note COT-floor to ceil has a different bit b3) use cat4 LBT and for second half (COT-floor/2 to COT-floor) use cat2 LBT, for UL configured grant transmissions (May be because 1st half only has a pause). As another example, (b0_1,b0_0) =(1,1) could mean both in first half of the TXOP (i.e. 0 to COT-floor/2) and second half of TXOP (COT-floor/2 to COT-floor) DL RRC configured transmissions (like P-CSI-RS) are valid (May be because both in 1st half and 2nd half the DL configured transmit locations don't fall inside any pause).

Figure 5:
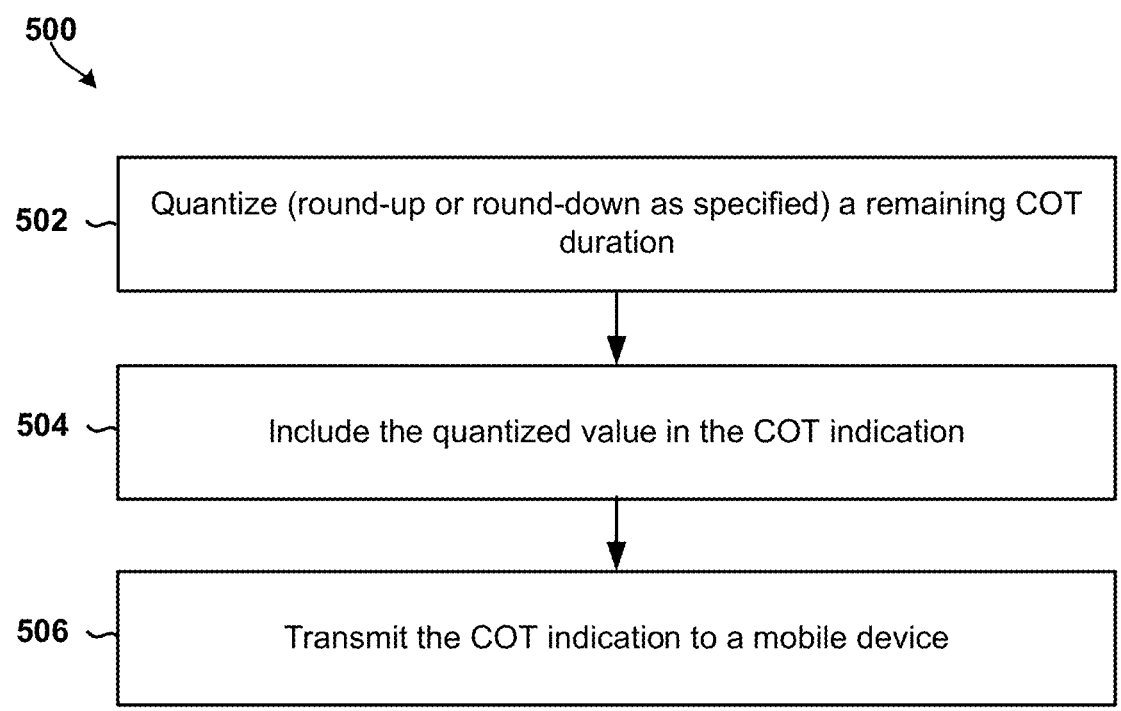
FIGS. 5 and 6 are process flow diagrams illustrating methods of implementing transmit opportunity channel occupancy time indication for new radio for unlicensed spectrum communications in accordance with some embodiments.

FIG. 5 illustrates a method 500 of implementing transmit opportunity channel occupancy time indication for new radio for unlicensed spectrum communications in accordance with an embodiment. Method 500 may be performed by a processor in a base station.

In block 502, the base station processor may quantize a remaining COT duration, which may include determining a COT ceiling for the remaining COT duration, determining a COT floor for the remaining COT duration, describing pauses inside the TXOP, etc.

In block 504, the base station processor may include the quantized value in the COT indication.

In block 506, the base station processor may transmit the COT indication to a mobile device.

Figure 6:
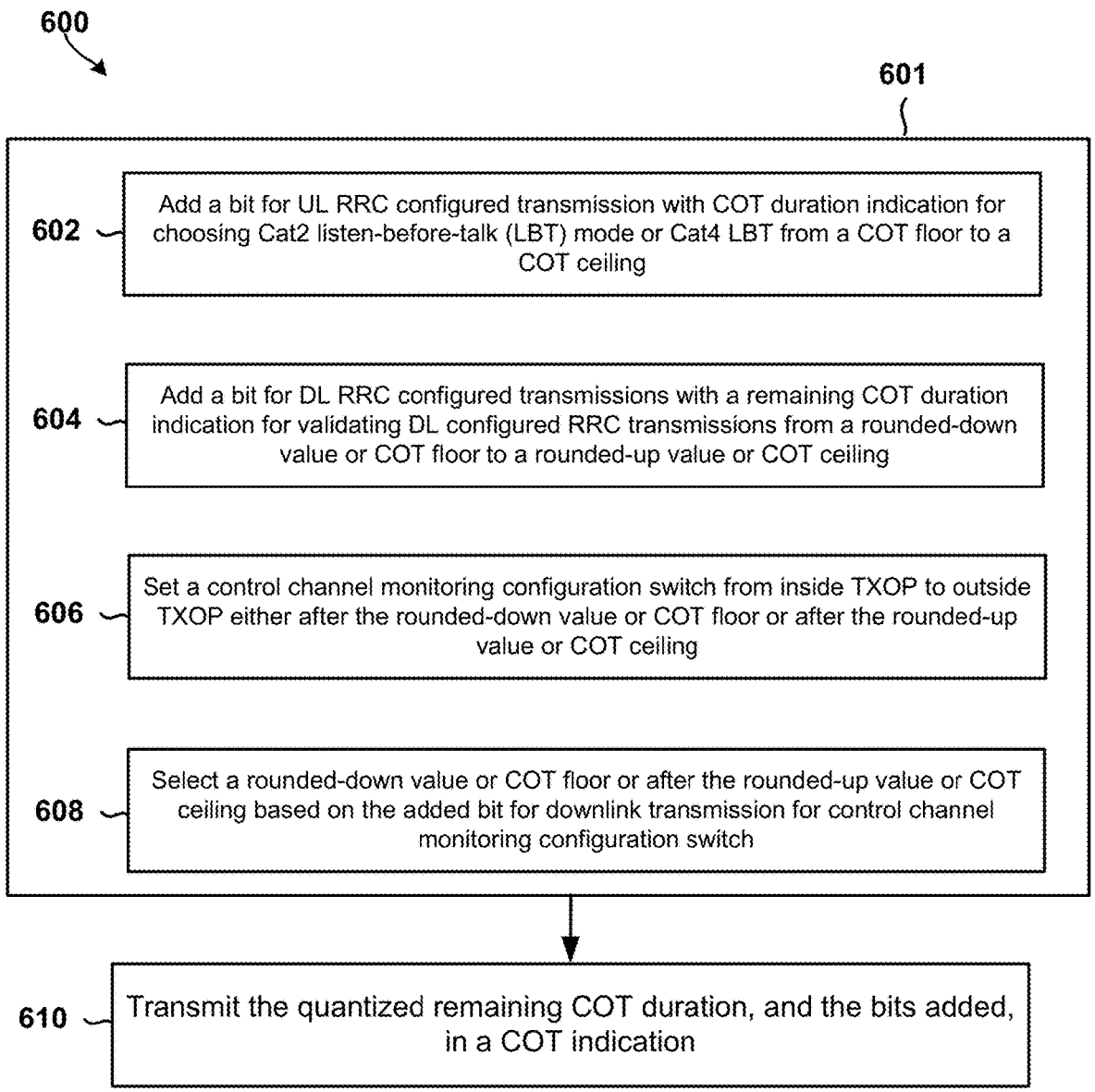

FIG. 6 illustrates a method 600 of implementing transmit opportunity channel occupancy time indication for new radio for unlicensed spectrum communications in accordance with another embodiment. Method 600 may be performed by a processor in a base station.

As part of the quantized remaining COT duration (e.g., in block 502 illustrated in FIG. 5), in block 601, the base station processor may add a bit for an UL transmission slot with a remaining COT duration indication for choosing Cat2 LBT mode or Cat4 LBT from a COT floor to a COT ceiling in block 602, add a bit for a DL transmission slot with a remaining COT duration indication for validating DL radio resource control (RRC) configured transmissions from a COT floor to a COT ceiling in block 604, set a control channel monitoring configuration switch from inside TXOP to outside TXOP either after the COT floor or after the COT ceiling in block 606, and/or a rounded-down value or COT floor or after the rounded-up value or COT ceiling based on the added bit for downlink transmission for control channel monitoring configuration switch in block 608.

In block 610, the base station processor may transmit the quantized value or the quantized remaining COT duration, and the bits added, in a COT indication.

A mobile device may be configured to receive a COT indication from a base station, and intelligently monitor a PDCCH for UL and DL transmissions based on a quantized remaining COT duration value included in the COT indication. The mobile device may be configured to process the COT indication received by the user equipment device on the basis that remaining COT duration value may be signaled independent of the NR Release 15 SFI indication that indicates the UL/DL for each symbol, and the COT indication may identify multiple remaining COT duration values in various DL transmissions, such as one remaining COT duration value in each DL slot, every other DL slot, or just one DL slot within the COT.

The mobile device may receive and use the remaining COT duration indication (or remaining COT duration value included in the COT indication) to manage UL transmissions and/or monitor for DL transmissions near the end of a COT within the fractional time between the COT floor and the COT ceiling.

For example, the mobile device may be configured to process the COT indication received by the user equipment device on the basis that the remaining COT duration indication may include 11 bits (b10-b0) for a DL transmission slot, three of which are used indicate the quantized remaining COT duration (e.g., a COT floor of 5 and a COT ceiling of 6). One of the bits (e.g., bit b3, etc.) may indicate an UL configured slot to grant cat2 or cat4 for the last portion of TXOP between the COT floor and the COT ceiling. Also, the mobile device may be configured to process the COT indication received by the user equipment device on the basis that another bit (e.g., bit b2, etc.) may indicate whether a DL configured transmit is valid or invalid for the last portion of TXOP (between the COT floor and the COT ceiling).

In addition, the mobile device may be configured to process the COT indication received by the user equipment device on the basis that one of the bits (e.g., bit b1, etc.) may indicate to the mobile device that if an UL configured slot is inside the TXOP between the COT start or the current COT position and the COT floor, the mobile device should transition to use a cat2 or cat4 LBT mode. Another bit (e.g., bit b0) may indicate to the mobile device whether a configured DL transmit that is inside the TXOP (e.g., between the current position and the COT floor) is valid.

By using these few bits included in the remaining COT duration indication to manage UL transmissions and/or monitor for DL transmissions, the mobile device may reduce the amount of the mobile device's processing, battery, and communication resources used to access shared unlicensed spectrum in a NR network.

Figure 7:
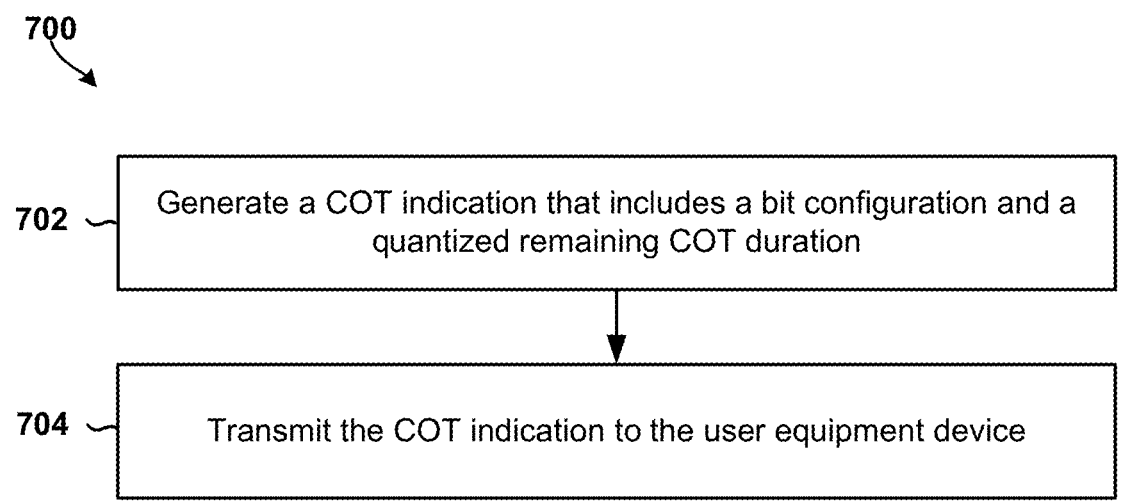
FIG. 7 is a process flow diagram illustrating a method of wireless communication performed by a base station in accordance with an embodiment.

FIG. 7 illustrates a method 700 of wireless communication performed by a base station in accordance with an embodiment. With reference to FIGS. 1-7, operations of the method 700 may be performed by a processing system (e.g., 100) or processor coupled to memory within the base station device.

In block 702, the processing system may generate a COT indication for a user equipment device. The COT indication may include a bit configuration and a quantized remaining COT duration. In some embodiments, the quantized remaining COT duration may be quantized to a COT floor or a lower quantization level. In some embodiments, the operations in block 702 performed by the processing system may include generating the COT indication for the UE comprises generating multiple COT indications within a TXOP, and transmitting the COT indication to the UE comprises transmitting the multiple COT indications to the UE. In some embodiments, the quantized remaining COT duration in each of the multiple COT indications may indicate a same end of the TXOP. In some embodiments, the bit configuration may include one or more pause indication bits that indicate whether UL RRC configured transmissions within a TXOP fall inside a pause, and the processing system may perform operations as part of block 702 including dividing the TXOP into multiple TXOP segments, in which each of the pause indication bits may indicate cat2 LBT mode or cat4 LBT mode for each of the multiple TXOP segments for UL RRC configured transmissions.

In some embodiments, the operations in block 702 performed by the processing system may include changing the sub-band usage indication in the COT or TXOP by reducing the frequencies and/or sub-bands included in the COT or TXOP, and generating a sub-band usage indication within the COT or TXOP in which the sub-band usage indication indicates frequencies and/or sub-bands that are included in the COT or TXOP.

In block 704, the base station may transmit the COT indication to the user equipment device.

Figure 8:
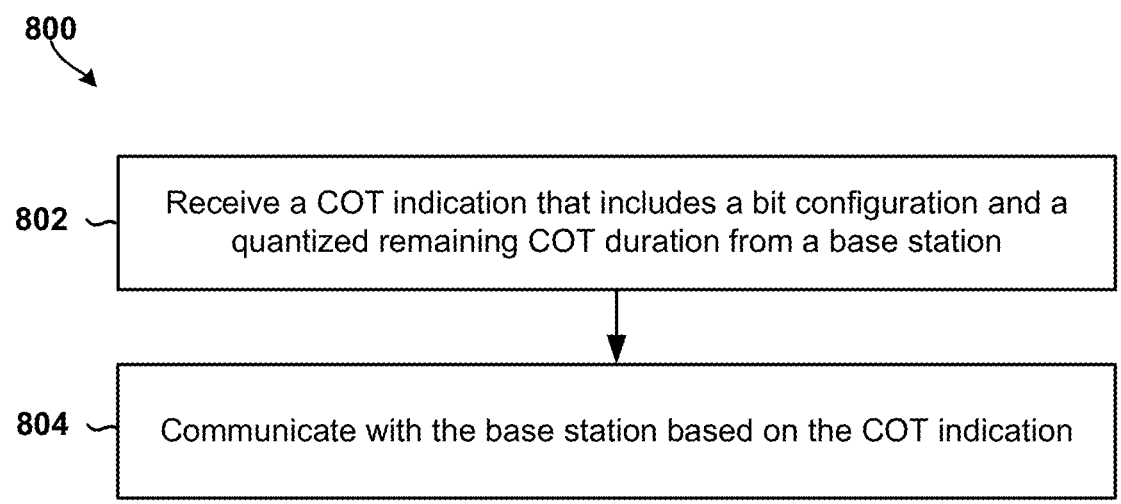
FIG. 8 is a process flow diagram illustrating a method of wireless communication performed by a user equipment device in accordance with an embodiment.

FIG. 8 illustrates a method 800 of wireless communication performed by a UE device (or mobile device) in accordance with various embodiments. With reference to FIGS. 1-8, operations of the method 800 may be performed by a processing system (e.g., 100) or processor coupled to memory within a UE device.

In block 802, the processing system may receive from a base station a COT indication that includes a bit configuration and a quantized remaining COT duration from a base station. In some embodiments, the operations in block 802 performed by the processing system may include receiving a COT indication that includes a quantized remaining COT duration that quantizes a remaining COT duration to at least one of a COT floor, a lower quantization level, a COT ceiling or a higher quantization level. In some embodiments, the bit configuration in the received COT may include one or more pause indication bits that indicate whether UL RRC configured transmissions within a TXOP fall inside a pause, in which case each of the pause indication bits may indicate cat2 listen-before-talk (LBT) mode or cat4 LBT mode for each of a multiple TXOP segments for UL RRC configured transmissions.

As noted above, the base station may divide the TXOP into multiple TXOP segments with each of the pause indication bits indicating cat2 LBT mode or cat4 LBT mode for each of the multiple TXOP segments for UL RRC configured transmissions. Thus, in some embodiments, the operations in block 802 performed by the processing system may include receiving a sub-band usage indication within the COT or TXOP in which the sub-band usage indication indicates frequencies and/or sub-bands that are included in the COT or TXOP.

In block 804, the processing device may perform operations to enable the UE device to communicate with the base station based on the COT indication. In some embodiments, the operations in block 804 performed by the processing system may include the processing system monitoring a PDCCH for UL and DL transmissions based on the quantized remaining COT duration. In some embodiments, the operations in block 804 performed by the processing system may include the processing system determining whether the quantized remaining COT duration has expired, and transitioning from a Cat2 LBT mode to a Cat4 LBT mode in response to determining that the quantized remaining COT duration has expired. In some embodiments, the operations in block 804 performed by the processing system may include the processing system avoiding incorrect use of a PDCCH monitoring configuration inside the TXOP when the PDCCH monitoring configuration inside the TXOP is different than the PDCCH monitoring configuration outside the TXOP by not switching the PDCCH monitoring configuration until after the COT ceiling. In some embodiments, the operations in block 804 performed by the processing system may include the processing system avoiding incorrect use of a PDCCH monitoring configuration inside the TXOP when the PDCCH monitoring configuration inside the TXOP is different than the PDCCH monitoring configuration outside the TXOP by switching to mini-slot monitoring after the COT floor, or using the PDCCH monitoring configuration outside the TXOP after the COT floor. In some embodiments, the operations in block 804 performed by the processing system may include the processing system avoiding incorrect use of a PDCCH monitoring configuration inside the TXOP when a bit, or a PDCCH monitoring flag, included in the bit configuration determines a PDCCH monitoring behavior and the PDCCH monitoring configuration inside the TXOP is different than the PDCCH monitoring configuration outside the TXOP by not switching the PDCCH monitoring configuration until after the COT ceiling, and switching the PDCCH monitoring configuration after receiving the PDCCH monitoring flag.

Various embodiments may include a method of wireless communication performed by a base station, which may include generating a COT indication for a user equipment device in which the COT indication includes a bit configuration and a quantized remaining COT duration, and transmitting the generated COT indication to the user equipment device.

In some embodiments, the bit configuration may include at least one or more of a bit that indicates whether a UL RRC configured transmission is to use cat2 LBT mode or cat4 LBT mode for a portion of a TXOP between a COT floor and a COT ceiling, a bit that indicates whether a DL RRC configured transmission is valid for the portion of the TXOP between the COT floor and the COT ceiling, a bit (e.g., pause indication bit) that indicates the cat2 LBT mode or the cat4 LBT mode for UL RRC configured transmissions for a portion of the TXOP before the COT floor, a bit (e.g., pause indication bit) that indicates whether a DL RRC configured transmission is valid for the portion of the TXOP before the COT floor, or one or more bits that indicate the quantized remaining COT duration.

In some embodiments, the remaining COT duration may be quantized to the COT floor (or a lower quantization level, a rounded-down duration value, etc.). In some embodiments, the remaining COT duration may be quantized to a COT ceiling (or a higher quantization level, a rounded-up duration value, etc.).

In some embodiments, generating the COT indication for the user equipment device may include using an SFI to explicitly cancel an RRC configured UL or DL transmission between an actual COT duration and the COT ceiling (or the higher quantization level).

In some embodiments, the bit configuration may include a bit that indicates whether to enable or cancel RRC configured DL transmissions from COT-floor to COT ceiling (herein we refer to this duration from COT floor to COT ceiling as the last quantum of the quantized remaining COT duration e.g., the last millisecond between 5 ms and 6 ms, if the COT-floor is 5 ms and the quantization is linear with 1 ms quantum or step size), and/or a bit that indicates whether to enable or cancel RRC configured UL transmissions in the last quantum of the quantized remaining COT duration. In some embodiments, the bit configuration may include a bit that indicates that all RRC configured DL transmissions should be cancelled in a last quantum of the quantized remaining COT duration, and/or a bit that indicates that RRC configured ULs should be cancelled in the last quantum of the quantized remaining COT duration.

In some embodiments, transmitting the COT indication to the user equipment device may include using quantization to signal or indicate in a control channel a remaining COT duration to the user equipment device with a few overhead bits. The quantization may be configured by RRC and/or specified in a standard based on a number of bits available in the control channel The quantization may be linear (e.g., a step size and range configured) or non-linear (e.g., a table with bits mapping to duration values).

In some embodiments, the bit configuration may include one bit for an UL RRC configured transmission with a remaining COT duration indication for choosing cat2 LBT mode or cat4 LBT mode between a COT floor to a COT ceiling, and one bit for a DL transmission with a remaining COT duration indication for validating RRC configured DL transmissions from the COT floor to the COT ceiling.

In some embodiments, generating the COT indication for the user equipment device may include generating multiple COT indications within a TXOP, and transmitting the COT indication to the user equipment device may include transmitting the multiple COT indications to the user equipment device. In some embodiments, the multiple COT indications include the same quantized remaining COT duration. In some embodiments, the multiple COT indications include different quantized remaining COT durations reflective of how much time remains in the TXOP at the time each COT indication is transmitted. In some embodiments, the different quantized COT durations increase within the TXOP, providing an amount of time that has transpired within the TXOP, which the user equipment device can subtract from the TXOP COT to determine the time remaining in the TXOP. In some embodiments, the different quantized COT durations decrease within the TXOP, providing the time remaining in the TXOP.

Some embodiments may include quantizing the remaining COT duration so that the remaining COT indication may change during multiple indications within a TXOP by adjusting the remaining COT duration value to the COT ceiling or the COT floor.

Some embodiments may include dividing the TXOP into multiple TXOP segments, and adding a bit to the COT indication to indicate whether a UL RRC configured transmission is to use cat2 LBT mode or cat4 LBT mode for each of the multiple TXOP segments for UL RRC configured transmissions. Some embodiments may include using an n-bit-map for segments of the TXOP (e.g., until the COT-floor) and indicate cat2 LBT mode or cat4 LBT mode for RRC configured UL transmissions in the TXOP. For example, 1 bit (1 segment in the TXOP till the COT-floor) of pause indication may be used to indicate whether RRC configured UL transmissions in the TXOP should use cat2 or cat4 LBT.

In some embodiments, generating the COT indication for the user equipment device may further include generating a sub-band usage indication within the COT or TXOP. In some embodiments, the sub-band usage indication indicates frequencies and/or sub-bands that are included in the COT or TXOP. Some embodiments may not allow changing the sub-band usage indication in the TXOP. Some embodiments may include changing the sub-band usage indication in the COT or TXOP. In some embodiments, changing the sub-band usage indication in the COT may include reducing the frequencies and/or sub-bands included in the COT or TXOP because the first indication may not be accurate due to the delay involved in encoding the actual sub-band usage after successful channel access. In some embodiments, the method may include utilizing a COT duration (or quantized indication remaining COT duration value) for multiple sub-bands in the unlicensed channel (e.g., four 20 MHz sub-bands in an 80 MHz bandwidth).

Some embodiments may also include a method of wireless communication performed by a user equipment device, which may include receiving, from a base station, a COT indication that includes a bit configuration and a quantized remaining COT duration for the user equipment device, and communicating with the base station based on the COT indication.

Some embodiments may include the user equipment device (or a processor in the user equipment device) monitoring a PDCCH for UL and DL transmissions based on the quantized remaining COT duration. Some embodiments may include the user equipment device determining whether the quantized remaining COT duration has expired, and transitioning from a Cat2 LBT mode to a Cat4 LBT mode in response to determining that the quantized remaining COT duration has expired. Some embodiments may include the user equipment device utilizing a COT duration (or quantized indication remaining COT duration values) for multiple sub-bands in the unlicensed channel (e.g., four 20 MHz sub-bands in an 80 MHz bandwidth).

In some embodiments, the bit configuration (included in COT indication received by the user equipment device) may include at least one or more bits that indicates cat2 LBT mode or cat4 LBT mode for a portion of a TXOP for RRC configured UL transmissions between a COT floor and a COT ceiling, a bit that indicates whether a DL RRC configured transmission is valid for the portion of the TXOP between the COT floor and the COT ceiling, a pause indication bit that indicates the cat2 LBT mode or the cat4 LBT mode for RRC configured UL transmissions for a portion of the TXOP before the COT floor, a pause indication bit that indicates whether a DL RRC configured transmission is valid for the portion of the TXOP before the COT floor, or one or more bits that indicate the quantized remaining COT duration.

In some embodiments, the user equipment device may process the COT indication received by the user equipment device on the basis that the remaining COT duration is quantized to a COT floor (or rounded-down to a lower quantization level). In some embodiments, the user equipment device may process the COT indication received by the user equipment device on the basis that the remaining COT duration is quantized to a COT ceiling (or rounded-up to a higher quantization level).

Some embodiments may include the user equipment device avoiding incorrect use of a PDCCH monitoring configuration inside the TXOP when the PDCCH monitoring configuration inside the TXOP is different than the PDCCH monitoring configuration outside the TXOP by not switching the PDCCH monitoring configuration until after the COT ceiling.

Some embodiments may include the user equipment device avoiding incorrect use of a PDCCH monitoring configuration outside the TXOP when the PDCCH monitoring configuration inside the TXOP is different than the PDCCH monitoring configuration outside the TXOP by switching to mini-slot monitoring before the COT ceiling, or using the PDCCH monitoring configuration outside the TXOP after the COT floor.

Some embodiments may include the user equipment device using a bit, included in the bit configuration that determines the UE PDCCH monitoring behavior, when the PDCCH monitoring configuration inside the TXOP is different than the PDCCH monitoring configuration outside the TXOP, not switching the PDCCH monitoring configuration until after the COT ceiling, and/or switching to PDCCH monitoring configuration outside the TXOP after the COT floor.

In some embodiments, the user equipment device may process the COT indication received by the user equipment device on the basis that the COT indication includes an SFI for explicitly canceling an RRC configured UL or DL transmission between an actual COT duration and the COT ceiling (or the higher quantization level). In some embodiments, the user equipment device may process the COT indication received by the user equipment device on the basis that the bit configuration (included in COT indication received by the user equipment device) includes a bit that indicates whether to enable or cancel RRC configured DL transmissions in a last quantum of the quantized remaining COT duration (COT-floor to COT-ceiling, e.g., in the millisecond between 5 ms and 6 ms), and/or a bit that indicates whether to enable or cancel RRC configured UL transmissions in the last quantum of the quantized remaining COT duration. In some embodiments, the user equipment device may process the COT indication received by the user equipment device on the basis that the bit configuration includes a bit that indicates that all RRC configured DL transmissions should be cancelled in a last quantum of the quantized remaining COT duration (e.g. last 5-6 ms), and/or a bit that indicates that all RRC configured UL should be cancelled in the last quantum of the quantized remaining COT duration.

In some embodiments, receiving the COT indication may include receiving in a control channel a signal or indication of the quantized remaining COT duration that uses a few overhead bits. The quantization may be configured by RRC and/or specified in a standard based on a number of bits available in the control channel The quantization may be linear (e.g., a step size and range configured) or non-linear (e.g., a table with bits mapping to duration values). In some aspects, the user equipment device may process the COT indication received by the user equipment device on the basis that the bit configuration may include at least one of one bit for a DL transmission with a remaining COT duration indication for validating configured DL transmissions from the COT floor to the COT ceiling. Some aspects may include the user equipment device setting a control channel monitoring configuration switch from inside TXOP to outside TXOP after the COT floor or after the COT ceiling.

Some aspects may include the user equipment device determining whether to set the control channel monitoring configuration switch after the COT floor or after the COT ceiling based on the bit for DL transmission included in the bit configuration.

In some aspects, receiving the COT indication may include receiving multiple COT indications within a TXOP. In some aspects, the user equipment device may process the COT indication received by the user equipment device on the basis that the multiple COT indications include a same quantized remaining COT duration. In some aspects, the user equipment device may process the COT indication received by the user equipment device on the basis that the multiple COT indications include different quantized remaining COT duration. In some aspects, the user equipment device may process the COT indication received by the user equipment device on the basis that the different quantized COT durations (e.g., duration from start to end of the COT, etc.) increase within the TXOP. In some aspects, the user equipment device may process the COT indication received by the user equipment device on the basis that the different quantized COT durations decrease within the TXOP. In some aspects, the user equipment device may process the COT indication received by the user equipment device on the basis that the indicated end of TXOP may change during multiple indications within a TXOP and the remaining COT duration value is adjusted to the COT ceiling or the COT floor.

In some aspects, the user equipment device may process the COT indication received by the user equipment device on the basis that the TXOP is divided into multiple TXOP segments, and the bit configuration included in COT indication received by the user equipment device may include pause indication bits that indicate cat2 LBT mode or cat4 LBT mode for each of the multiple TXOP segments for UL RRC configured transmissions.

In some aspects, receiving the COT indication may include receiving a sub-band usage indication within the COT or TXOP. In some aspects, the user equipment device may process the COT indication received by the user equipment device on the basis that the sub-band usage indication identifies frequencies and/or sub-bands that are included in the COT or TXOP. Some aspects may include the user equipment device changing the sub-band usage indication in the COT or TXOP. In some aspects, changing the sub-band usage indication in the COT may include reducing the frequencies and/or sub-bands included in the COT or TXOP.

Figure 9:
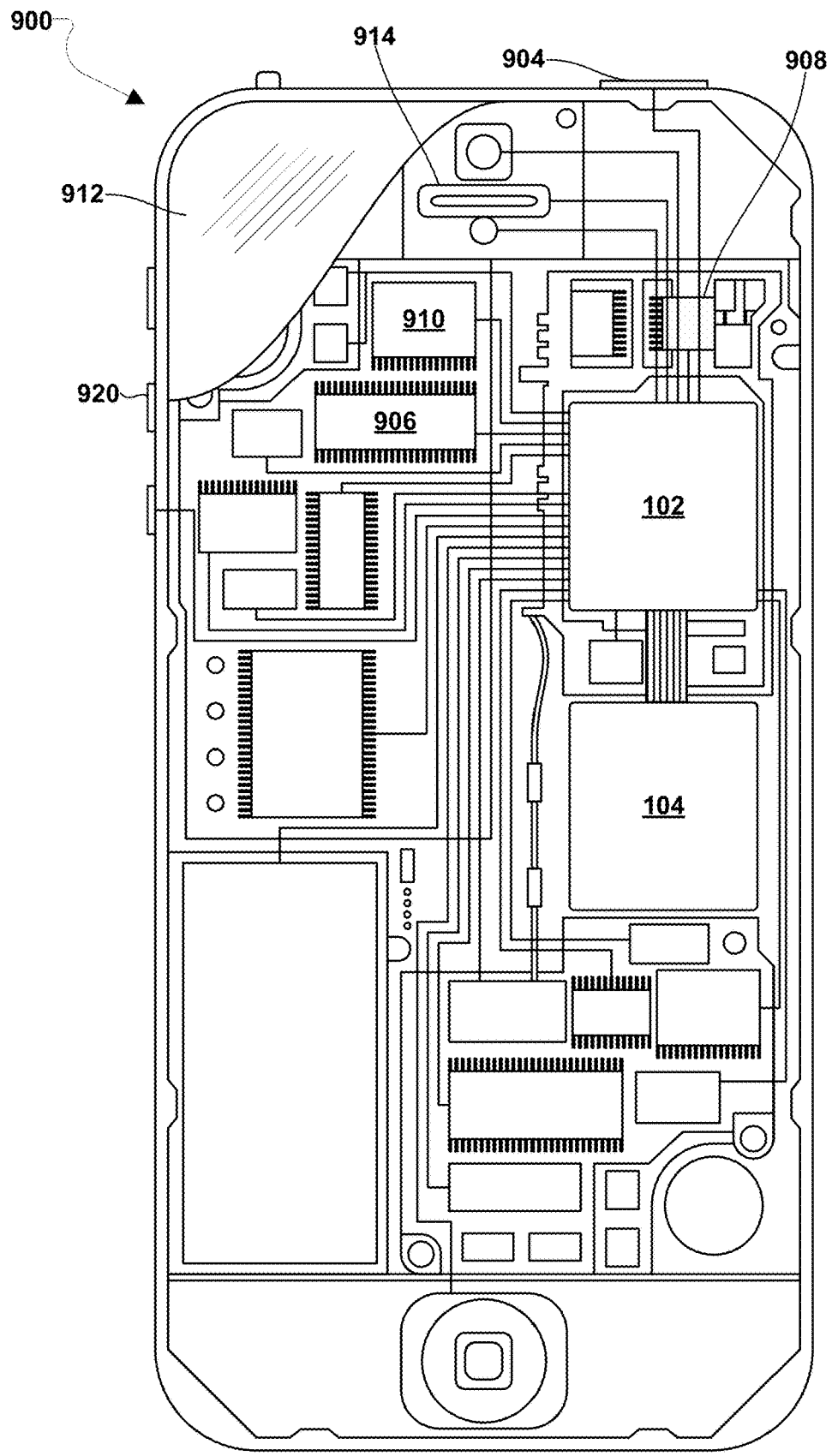
FIG. 9 is a component block diagram of mobile device suitable for implementing the various embodiments.

The various embodiments may be implemented on a variety of mobile devices, an example of which in the form of a smartphone is illustrated in FIG. 9. A smartphone 900 may include a first SOC 102 (e.g., a SOC-CPU) coupled to a second SOC 104 (e.g., a 5G capable SOC). The first and second SOCs 102, 104 may be coupled to internal memory 906, a display 912, and to a speaker 914.

Additionally, the smartphone 900 may include an antenna 904 for sending and receiving electromagnetic radiation that may be connected to a wireless data link and/or cellular telephone transceiver 908 coupled to one or more processors in the first and/or second SOCs 102, 104. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 102, 104, wireless transceiver 908 and CODEC 910 may include a digital signal processor (DSP) circuit (not illustrated separately).

Figure 10:
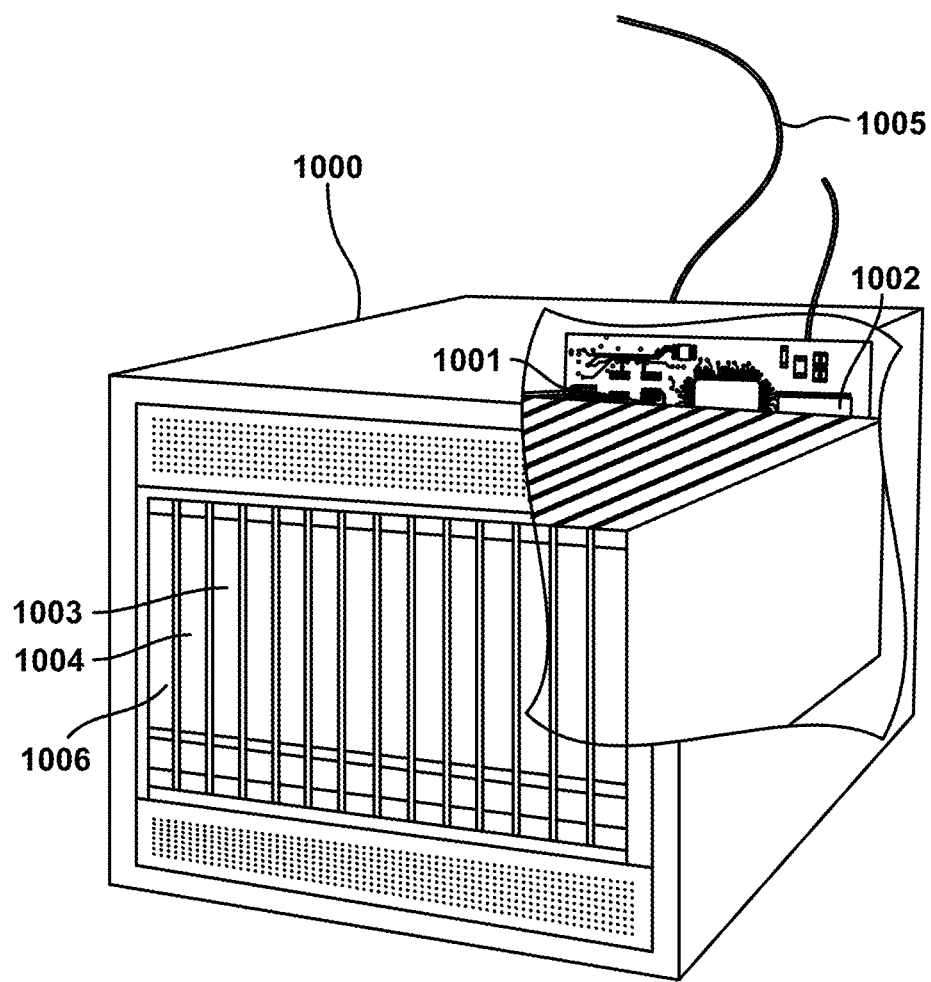
FIG. 10 is a component block diagram of server suitable for use with the various embodiments.

Various components and embodiments, such as a base station, may be implemented on any of a variety of commercially available computing devices, such as a server 1000 an example of which is illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1005, such as a local area network coupled to other operator network computers and servers.

The processors 116, 118, 160, 1001 may be any programmable microprocessor, microcomputer or multiple processor chip or chips that may be configured by software instructions (applications) to perform a variety of functions, including the functions of the various embodiments described in this application. In some mobile devices, multiple processors may be provided, such as one processor dedicated to wireless communication functions and one processor dedicated to running other applications. Typically, software applications may be stored in the internal memory 120, 158, 906, 1003 before they are accessed and loaded into the processor. The processor may include internal memory sufficient to store the application software instructions.

Various embodiments illustrated and described are provided merely as examples to illustrate various features of the claims. However, features illustrated and described with respect to any given embodiment are not necessarily limited to the associated embodiment and may be used or combined with other embodiments that are illustrated and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, functional components, functionality components, circuits, and algorithm operations described in connection with the embodiments disclosed herein may be implemented as electronic hardware, computer software, or combinations of both. To clearly illustrate this interchangeability of hardware and software, various illustrative components, blocks, functional components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, functional components, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of wireless communication performed by a base station, comprising:
   generating multiple channel occupancy time (COT) indications within a transmit opportunity (TXOP) for a user equipment (UE), wherein:
      each of the multiple COT indications comprises a quantized remaining COT duration; and
      the quantized remaining COT duration in each of the multiple COT indications indicates a same end of the TXOP; and
   transmitting the multiple COT indications to the UE.

2. The method of claim 1, wherein each of the multiple COT indications further comprises a bit configuration that includes one or more pause indication bits that indicate whether uplink (UL) radio resource control (RRC) configured transmissions within the TXOP fall inside a pause,
   the method further comprising dividing the TXOP into multiple TXOP segments, wherein each of the pause indication bits indicates cat2 listen-before-talk (LBT) mode or cat4 LBT mode for each of the multiple TXOP segments for UL RRC configured transmissions.

3. The method of claim 1, wherein generating the multiple COT indications for the UE further comprises generating a sub-band usage indication within at least one of the multiple COT indications or within the TXOP, wherein the sub-band usage indication indicates frequencies and/or sub-bands that are included in the COT or TXOP.

4. The method of claim 1, wherein the quantized remaining COT duration is quantized to a COT floor or a lower quantization level.

5. The method of claim 1, further comprising changing a sub-band usage indication in the COT or TXOP by reducing the frequencies and/or sub-bands included in the COT or TXOP.

6. A base station, comprising:
   a processor configured with processor-executable instructions to perform operations comprising:
      generating multiple channel occupancy time (COT) indications within a transmit opportunity (TXOP) for a user equipment (UE), wherein:
         each of the multiple COT indications comprises a quantized remaining COT duration; and
         the quantized remaining COT duration in each of the multiple COT indications indicates a same end of the TXOP; and
      transmitting the multiple COT indications to the UE.

7. The base station of claim 6, wherein the processor is further configured with processor-executable instructions to perform operations such that each of the multiple COT indications further comprises a bit configuration that includes one or more pause indication bits that indicate whether uplink (UL) radio resource control (RRC) configured transmissions within the TXOP fall inside a pause,
   the method further comprising dividing the TXOP into multiple TXOP segments, wherein each of the pause indication bits indicates cat2 listen-before-talk (LBT) mode or cat4 LBT mode for each of the multiple TXOP segments for UL RRC configured transmissions.

8. The base station of claim 6, wherein the processor is further configured with processor-executable instructions to perform operations further comprising:
   generating a sub-band usage indication within at least one of the multiple COT indications or within the TXOP that indicates the frequencies or sub-bands that are included in the COT or TXOP.

9. The base station of claim 6, wherein the processor is configured with processor-executable instructions to perform operations such that the quantized remaining COT duration is quantized to a COT floor or a lower quantization level.

10. The base station of claim 6, wherein the processor is configured with processor-executable instructions to perform operations further comprising changing a sub-band usage indication in the COT or TXOP by reducing the frequencies and/or sub-bands included in the COT or TXOP.

11. A method of wireless communication performed by a user equipment (UE), comprising:
   receiving, from a base station, multiple channel occupancy time (COT) indications within a transmit opportunity (TXOP), wherein:
      each of the multiple COT indications comprises a quantized remaining COT duration; and
      the quantized remaining COT duration in each of the multiple COT indications indicates a same end of the TXOP; and
   communicating with the base station based on at least one or more of the multiple COT indications.

12. The method of claim 11, further comprising:
   monitoring a physical downlink control channel (PDCCH) for uplink (UL) and downlink (DL) transmissions based on the quantized remaining COT duration.

13. The method of claim 11, wherein receiving the multiple COT indications comprises receiving a COT indication that includes a quantized remaining COT duration that quantizes a remaining COT duration to at least one of a COT floor, a lower quantization level, a COT ceiling or a higher quantization level,
   the method further comprising avoiding incorrect use of a physical downlink control channel (PDCCH) monitoring configuration inside the TXOP when the PDCCH monitoring configuration inside the TXOP is different than the PDCCH monitoring configuration outside the TXOP by not switching the PDCCH monitoring configuration until after the COT ceiling.

14. The method of claim 11, wherein receiving the multiple COT indications receiving a COT indication that includes a quantized remaining COT duration that quantizes a remaining COT duration to at least one of a COT floor, a lower quantization level, a COT ceiling or a higher quantization level,
   the method further comprising avoiding incorrect use of a physical downlink control channel (PDCCH) monitoring configuration outside the TXOP when the PDCCH monitoring configuration inside the TXOP is different than the PDCCH monitoring configuration outside the TXOP by:
      switching to mini-slot monitoring after the COT floor; or
      using the PDCCH monitoring configuration outside the TXOP after the COT floor.

15. The method of claim 11, wherein receiving the multiple COT indications comprises receiving a COT indication that includes a quantized remaining COT duration that quantizes a remaining COT duration to at least one of a COT floor, a lower quantization level, a COT ceiling or a higher quantization level,
   the method further comprising avoiding incorrect use of a physical downlink control channel (PDCCH) monitoring configuration outside the TXOP when a bit, or a PDCCH monitoring flag, included in a bit configuration included in each of the COT indications determines a PDCCH monitoring behavior and the PDCCH monitoring configuration inside the TXOP is different than the PDCCH monitoring configuration outside the TXOP by:
not switching the PDCCH monitoring configuration until after the COT ceiling; and
switching the PDCCH monitoring configuration after receiving the PDCCH monitoring flag.

16. The method of claim 11, wherein each of the multiple COT indications further comprises a bit configuration that includes one or more pause indication bits that indicate whether uplink (UL) radio resource control (RRC) configured transmissions within the TXOP fall inside a pause, and wherein each of the pause indication bits indicates cat2 listen-before-talk (LBT) mode or cat4 LBT mode for each of a multiple TXOP segments for UL RRC configured transmissions.

17. The method of claim 11, further comprising receiving a sub-band usage indication within the COT or TXOP, wherein the sub-band usage indication indicates frequencies and/or sub-bands that are included in the COT or TXOP.

18. The method of claim 11, wherein the quantized remaining COT duration is quantized to a COT floor or a lower quantization level.

19. The method of claim 11, further comprising
determining, via a processor in the UE, whether the quantized remaining COT duration has expired; and
transitioning from a Cat2 listen-before-talk (LBT) mode to a Cat4 LBT mode in response to determining that the quantized remaining COT duration has expired.

20. A user equipment (UE) device comprising:
a processor configured with processor-executable instructions to perform operations comprising:
receiving, from a base station, multiple channel occupancy time (COT) indications within a transmit opportunity (TXOP), wherein:
each of the multiple COT indications comprises a quantized remaining COT duration; and
the quantized remaining COT duration in each of the multiple COT indications indicates a same end of the TXOP; and
communicating with the base station based on at least one or more of the multiple COT indications.

21. The UE device of claim 20, wherein the processor is configured processor-executable instructions to perform operations further comprising:
monitoring a physical downlink control channel (PDCCH) for uplink (UL) and downlink (DL) transmissions based on the quantized remaining COT duration.

22. The UE device of claim 20, wherein:
the processor is configured processor-executable instructions to perform operations such that receiving the multiple COT indications comprises receiving a COT indication that includes a quantized remaining COT duration that quantizes a remaining COT duration to at least one of a COT floor, a lower quantization level, a COT ceiling or a higher quantization level; and
the processor is configured processor-executable instructions to perform operations further comprising avoiding incorrect use of a physical downlink control channel (PDCCH) monitoring configuration inside the TXOP when the PDCCH monitoring configuration inside the TXOP is different than the PDCCH monitoring configuration outside the TXOP by not switching the PDCCH monitoring configuration until after the COT ceiling.

23. The UE device of claim 20, wherein:
the processor is configured processor-executable instructions to perform operations such that receiving the multiple COT indications comprises receiving a COT indication that includes a quantized remaining COT duration that quantizes a remaining COT duration to at least one of a COT floor, a lower quantization level, a COT ceiling or a higher quantization level; and
the processor is configured processor-executable instructions to perform operations further comprising avoiding incorrect use of a physical downlink control channel (PDCCH) monitoring configuration outside the TXOP when the PDCCH monitoring configuration inside the TXOP is different than the PDCCH monitoring configuration outside the TXOP by:
switching to mini-slot monitoring after the COT floor; or
using the PDCCH monitoring configuration outside the TXOP after the COT floor.

24. The UE device of claim 20, wherein:
the processor is configured processor-executable instructions to perform operations such that receiving the multiple COT indications comprises receiving a COT indication that includes a quantized remaining COT duration that quantizes a remaining COT duration to at least one of a COT floor, a lower quantization level, a COT ceiling or a higher quantization level; and
the processor is configured processor-executable instructions to perform operations avoiding incorrect use of a physical downlink control channel (PDCCH) monitoring configuration outside the TXOP when a bit, or a PDCCH monitoring flag, included in a bit configuration included in each of the COT indications determines a PDCCH monitoring behavior and the PDCCH monitoring configuration inside the TXOP is different than the PDCCH monitoring configuration outside the TXOP further comprising:
not switching the PDCCH monitoring configuration until after the COT ceiling; and
switching the PDCCH monitoring configuration after receiving the PDCCH monitoring flag.

25. The UE device of claim 20, wherein each of the multiple COT indications further comprises a bit configuration that includes one or more pause indication bits that indicate whether uplink (UL) radio resource control (RRC) configured transmissions within the TXOP fall inside a pause, and wherein each of the pause indication bits indicates cat2 listen-before-talk (LBT) mode or cat4 LBT mode for each of a multiple TXOP segments for UL RRC configured transmissions.

26. UE device of claim 20, wherein the processor is configured processor-executable instructions to perform operations further comprising receiving a sub-band usage indication within the COT or TXOP, wherein the sub-band usage indication indicates frequencies and/or sub-bands that are included in the COT or TXOP.

27. The UE device of claim 20, wherein the quantized remaining COT duration is quantized to a COT floor or a lower quantization level.

28. The UE device of claim 20, further comprising:
determining, via a processor in the UE, whether the quantized remaining COT duration has expired; and transitioning from a Cat2 listen-before-talk (LBT) mode to a Cat4 LBT mode in response to determining that the quantized remaining COT duration has expired.

\* \* \* \* \*